United States Patent [19]

Bubula et al.

[11] 4,080,850

[45] Mar. 28, 1978

[54] CONTROLS FOR COMBINED HYDROSTATIC AND MULTIPLE SPEED RANGE TRANSMISSION UNITS WITH AUTOMATIC SPEED CONTROL AND BRAKING FUNCTIONS

[75] Inventors: Thomas J. Bubula, Joliet; Maurice F. Franz, East Peoria; Gordon W. Johnson, Peoria; James D. Rinaldo, Joliet, all of Ill.

[73] Assignee: Caterpillar Tractor Co., Peoria, Ill.

[21] Appl. No.: 609,637

[22] Filed: Sep. 2, 1975

[51] Int. Cl.² .................... B60K 41/00; F16D 31/02; F16H 47/02

[52] U.S. Cl. ........................... 74/861; 60/327; 60/389; 60/432; 74/731; 74/733

[58] Field of Search ............. 74/733, 732, 731, 730, 74/745, 336 R, 752 C, 861; 60/433, 389, 327

[56] References Cited

U.S. PATENT DOCUMENTS

| | | | |
|---|---|---|---|
| 3,293,932 | 12/1966 | Boydell et al. | 74/732 X |
| 3,302,487 | 2/1967 | Kempson | 74/733 |
| 3,463,034 | 8/1969 | Miller | 74/733 |
| 3,477,225 | 11/1969 | Cryder et al. | 60/433 |
| 3,782,225 | 1/1974 | Grabow | 74/733 X |
| 3,877,224 | 4/1975 | Johnson | 60/389 |

*Primary Examiner*—Samuel Scott
*Assistant Examiner*—Carl F. Pietruszka
*Attorney, Agent, or Firm*—Phillips, Moore, Weissenberger, Lempio & Majestic

[57] ABSTRACT

A drive train includes a hydrostatic transmission unit and a multiple speed range transmission unit arranged in series between a prime mover and a primary output shaft, variable displacement and torque transmitting capacity of the hydrostatic transmission unit being adjusted by hydraulic controls including a speed control valve for developing a differential pressure signal proportional to a desired rate of operation, a modulating valve for regulating the differential pressure signal corresponding to accelerating and decelerating operation of the transmission, a directional control valve for determining the direction of operation of the hydrostatic transmission unit, and a range selector valve for shifting the operating speed range of the multiple speed range transmission as the hydrostatic transmission approaches a limit of displacement, the displacement of the hydrostatic transmission being automatically reset in response to shifting of the multiple speed range transmission.

Operating speed limits are automatically established for the drive train by an override speed control valve which manually adjusts the differential pressure signal for reduced torque transmission through the drive train when the prime mover is operating below a minimum speed. A speed limiting control valve responds to operation of the prime mover above a maximum selected speed for automatically applying a brake within the drive train in order to supplement dynamic braking capacity of the transmission unit, the speed limiting control valve including means producing a feedback signal for resisting manual operation of the override speed control valve in proportion to engagement of the brake within the drive train.

33 Claims, 13 Drawing Figures

CONTROLS FOR COMBINED HYDROSTATIC AND MULTIPLE SPEED RANGE TRANSMISSION UNITS WITH AUTOMATIC SPEED CONTROL AND BRAKING FUNCTIONS

BACKGROUND OF THE INVENTION

The present invention is directed toward numerous features within a drive train of a type having a transmission unit which is capable of providing a generally continuous positive coupling within the drive train. Such a transmission unit is preferably embodied within a hydrostatic unit including at least one hydraulic translating means such as a pump or motor capable of variable displacement. Again, it is preferable that both the pump and motor be capable of variable displacement.

The present invention is also directed toward broadening the operating capabilities of such a transmission unit by combining it in series with a multiple speed range transmission.

The present invention is particularly concerned with automatically synchronizing operation of the two transmission units to achieve a smooth transition of torque transmitting capacity and operating speeds for the drive train.

The present invention is also concerned with providing automatic speed controls for a transmission unit of the type first noted above. Preferably, the means for synchronizing operation of the two transmission units as well as means for accomplishing the speed control functions referred to above are embodied in hydraulic controls as described in greater detail below. However, it will be apparent from the following description that the same or similar functions can be achieved through other control elements such as electronic control circuits.

Substantial efforts have been expended and are still being undertaken in an attempt to more effectively use the numerous advantages afforded by hydrostatic transmissions. Generally, hydrostatic transmissions present special problems in control since displacement of both the pump and motor must be varied in exact sequence in order to achieve efficient operation and to provide suitable regulation over torque transmitting capacity and operating speed of the drive train. For example, in such a hydrostatic transmission, the pump is commonly set at zero displacement with the motor being at or near its maximum displacement when the drive train is in a neutral condition.

For acceleration of the vehicle, displacement of the pump may first be varied toward a maximum value while the motor remains at its maximum displacement in order to develop maximum torque transmitting capacity for initially accelerating the vehicle. After the pump reaches maximum displacement, displacement of the motor may be gradually reduced to further accelerate the vehicle.

Usually, as the motor approaches minimum displacement, the full operating range of the hydrostatic transmission is realized according to the presently available prior art unless the transmission includes relatively sophisticated developments such as multiple pumps for extending the torque transmitting capacity of the hydrostatic transmission. However, such solutions tend to make the transmissions very complex while even further increasing difficulties in properly sequencing operation of the variable displacement components therein.

Accordingly, it is desirable to provide a relatively simple and easily controlled means for expanding the torque transmitting capacity of a hydrostatic transmission unit in order to better adapt hydrostatic transmission for use in a wide variety of vehicles. In particular, hydrostatic transmissions with expanded torque transmitting capacity would be useful in material handling machines such as earth moving vehicles where a single prime mover is employed both to supply motive power for the vehicle as well as to operate one or more implements which may also have substantial instantaneous power requirements relative to the maximum output capability of the prime mover.

An improved hydrostatic transmission would be particularly useful in such machinery for numerous reasons. For example, material handling vehicles must be adapted both for transport operation at relative high speeds as well as low speed, high torque operation of the vehicle together with intermittent operation of its implements. At such times, the vehicle may be subjected to frequent changes of direction and continuous accelerating and/or declerating operation. A hydrostatic transmission unit is very suitable for such applications particularly if automatic controls are provided to maximize use of the available power from the single prime mover.

A hydrostatic transmission could also be adapted for relieving the engine and increasing output torque during lug conditions by selectively and automatically reducing vehicle speed. In addition, a hydrostatic transmission would enable available power from a prime mover to be more precisely proportioned between what is required for motive power to the vehicle as well as supplying preferential power requirements of various implements mounted on or associated with the vehicle.

Examples of presently available hydrostatic transmissions for use in such vehicles are set forth, for example, in U.S. Pat. No. 3,302,390 to Christenson and U.S. Pat. No. 3,477,225 to Cryder et al, the last noted patent being assigned to the asignee of the present invention. The Christenson patent discloses a transmission which is adapted for operation of track-type vehicles whereas the present invention is particularly intended for use with wheeled vehicles since it provides only a single primary drive train. However, it will be apparent that numerous features of the present invention could also be used, for example, with track-type vehicles including dual primary drive trains.

Other examples of prior art in the area of hydrostatic transmissions include U.S. Pat. Nos. 3,187,509; 3,212,263; 3,236,049; 3,238,724; 3,247,669; 3,273,344; 3,285,000; 3,324,797; 3,331,480 and 3,411,297.

SUMMARY AND OBJECTS OF THE PRESENT INVENTION

Accordingly, it is an object of the present invention to provide a drive train with improved controls for expanding the torque transmitting capacity and operating speed range within the transmission and/or providing for automatic operation of numerous functions within the transmission to improve and facilitate its operation.

Another object of the present invention is to provide a multiple speed range transmission unit in combination with a transmission unit providing a positive drive coupling during both acceleration and deceleration of the drive train while also being adjustable for infinitely variable torque transmission capacity and speed of operation. A transmission unit exhibiting a positive drive coupling is preferably embodied as, but not limited to, a hydrostatic transmission.

The present invention provides controls for selectively regulating torque transmitting capacity of the positive drive coupling transmission unit while automatically shifting the operating range of the multiple speed range transmission when the first transmission unit approaches an operating limit. Preferably, the first transmission unit is reset at substantially the same time that the multiple speed range transmission is shifted in order to permit its continued response to a control signal for varying torque transmitting capacity within the new speed range.

It is a further object of the present invention to provide controls for a transmission unit providing a positive drive coupling during both accelerating and decelerating operation wherein a modulated signal is produced to closely regulate both accelerating and decelerating operation of the transmission. Preferably, a single modulating unit is employed to regulate the control signal representative of both accelerating and decelerating conditions within the drive train.

It is also an object of the invention to provide such controls for a transmission of the type noted immediately above wherein separate means are employed to regulate the rate of deceleration for the drive train when the direction of operation for the drive train is being reversed.

It is another object of the invention to provide a control assembly for a hydrostatic transmission unit wherein a variable differential pressure signal is produced in proportion to a desired rate of operation for the drive train, the differential pressure signal regulating numerous valve components which control operation of the hydrostatic transmission unit as well as for synchronizing its operation with that of a multiple speed range transmission.

Yet another object of the present invention is to provide a control assembly for a transmission unit of the type exhibiting a positive drive coupling during accelerating and decelerating conditions, a manual override control element being operable to selectively decelerate operation of the drive train independent from normal signal controls regulating its accelerating and decelerating operation.

A still further object of the invention is to provide a speed limiting control means for automatically applying a brake within the drive train when its prime mover is being driven at excessive rates of speed.

A corresponding object of the invention is to provide the speed limiting control means in combination with the manual override means referred to immediately above together with feedback means for resisting operation of the manual override means in proportion to engagement of the brake within the drive train.

Still another object of the invention is to provide a method for synchronizing operation of a hydrostatic transmission unit and a multiple speed range transmission unit arranged in series within a drive train, the method being characterized in that the multiple speed range transmission unit is shifted between speed ranges and, almost simultaneously, the hydrostatic transmission unit is reset in order to permit continued displacement variation in response to a control signal.

Another object of the invention is to provide a method for regulating operating speed of a transmission unit providing a positive coupling during both accelerating and decelerating operating conditions of the drive train wherein means producing a signal for normally establishing accelerating and decelerating rates of operation for the transmission may be overriden by separate means to selectively decelerate the drive train and also wherein a brake may be applied within the drive train in response to operation of a prime mover at excessive speeds in order to supplement dynamic braking capacity available within the transmission unit.

Additional objects and advantages of the invention are made apparent in the following description having reference to the accompanying drawings.

DESCRIPTION OF THE PREFERRED EMBODIMENT

In view of the relative complexity of the present invention and the drive train embodying the invention, the following description is presented under the following divisions:

1. The drive train and associated hydraulic supply and controls of FIG. 1.
2. A summary of the hydraulic control assembly illustrated in FIG. 2 and composite FIGS. 4–12.
3. Detailed description of the control assembly having reference to composite FIGS. 4–12.
4. Description of the preferred mode of operation.

Generally, it will be noted that the present invention is described with reference to a drive train including a hydrostatic transmission unit and a multiple speed range transmission unit under the regulation of a control assembly comprising a number of hydraulic valve components forming a hydraulic control circuit. However, it is emphasized again that numerous variations are possible within the scope of the present invention.

Further, it will be clearly apparent from the following description that the various control valve assembly components described below for regulating operation of the two transmission units, as illustrated in FIGS. 2–12, may readily be replaced by other control elements capable of performing the same or similar functions. In this connection, it will be particularly obvious that the novel control functions of the present invention may also be accomplished, for example, by means of an electronic control circuit.

Figure 1:
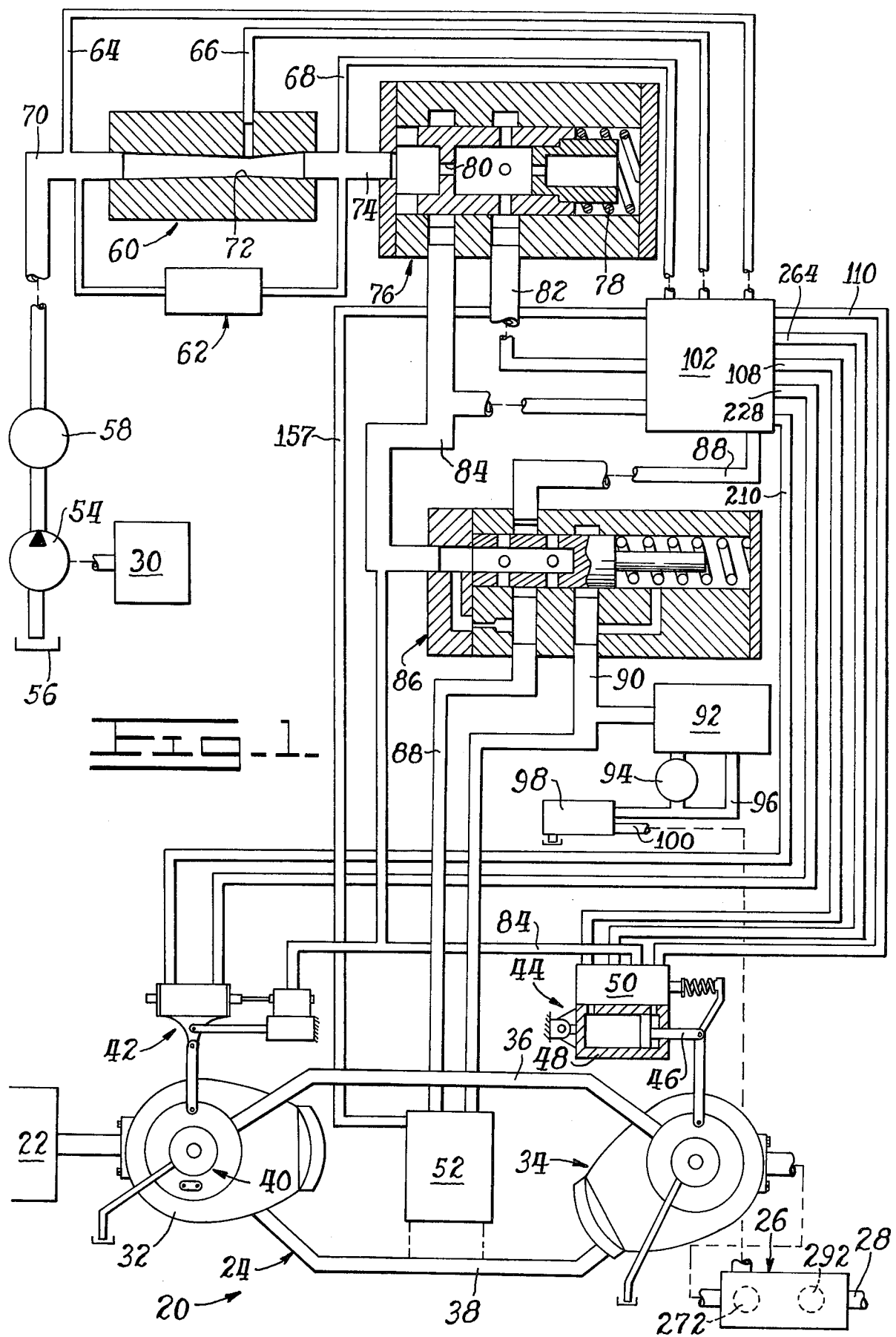
FIG. 1 is a partially schematic representation of a drive train including a hydrostatic transmission unit and a multiple speed range transmission unit together with a hydraulic circuit for controlling operation of the two transmission units as well as for supplying necessary fluid to the hydrostatic transmission unit.

(1) The Drive Train and Associated Hydraulic Supply and Controls of FIG. 1

Referring now to FIG. 1, a drive train 20 is schematically represented as including a prime mover or engine 22 with a hydrostatic transmission unit 24 and a multiple speed range transmission unit 26 being arranged in series between the prime mover 22 and a primary output shaft 28 suitable for providing motive power in a vehicle (not shown). The prime mover 22 is also directly coupled in driving relation with a pump 30 representative of an implement (not shown) having intermittent power requirements which are substantial relative to available power from the prime mover 22.

If the drive train 20 is employed for example, in a loader vehicle, the implement pump 30 could be employed to operate a bucket or other material handling means arranged upon lift arms of the loader vehicle (not shown). The actual identity of the implement is not of importance to the present invention except to note that power requirements of the implement together with motive power requirements for the vehicle may in combination exceed the available power from the prime mover 22. Accordingly, it is desirable to efficiently employ power from the prime mover 22 and to closely regulate operation of the drive train so that both motive and implement power may be available when required.

The hydrostatic transmission unit 24 is of a type including at least one variable displacement translating device such as the pump indicated at 32 and the motor indicated at 34. The hydrostatic pump and motor are interconnected by means of a hydrostatic loop comprising lines or manifolds 36 and 38 which are suitably adapted for high pressure operation of the hydrostatic transmission.

Construction details of such a pump and motor within a hydrostatic transmission unit may be seen, for example, in U.S. Pat. No. 3,381,472, which is assigned to the assignee of the present invention. For purposes of this disclosure, it is sufficient to understand that the pump and motor units 32 and 34 are respectively rotated about their trunnion mountings 40 in order to selectively change or vary their displacement. The pump 32 is rotated by means of a hydraulic servo actuator 42 while the motor 34 is rotated by operation of another servo actuator 44. Within the preferred embodiment of the present invention, the motor actuator 44 is preferably arranged to have its housing 48 fixed with its piston 46 being coupled for movement with the motor 34 in order to facilitate operation of a pilot means 50 in a manner described in greater detail below.

The hydrostatic transmission 24 is illustrated in a neutral control condition with the pump 32 being positioned for minimum or zero displacement and the motor 34 being arranged at or near a position of maximum displacement.

Because of the closed loop mode of operation between the hydrostatic pump 32 and motor 34, little fluid is lost from the transmission so that only a limited amount of make-up fluid need be added to the hydrostatic circuit. Accordingly, a conventional relief and replenishing valve group 52 is provided in communication with the hydrostatic lines 36 and 38 in order to assure an ample fluid supply and to maintain a suitable temperature range for fluid within the hydrostatic transmission components. The relief and replenishing valve group is adapted for operation at high pressure while being capable of removing or adding fluid to either of the hydrostatic lines 36 and 38 depending upon their relative pressurization.

Fluid under pressure which is supplied to the transmission units as well as being employed to regulate their operation in a manner described below, is delivered by means of a pump 54 which is also driven by the prime mover 22. The pump 54 is of a proportional type supplying output flow in proportion to operating speed of the prime mover 22. The pump 54 draws fluid from a reservoir 56 and directs it through a filter 58 toward a venturi orifice unit 60 including conventional thermal compensating means 62. Pressure taps 64, 66 and 68 are in respective communication with the venturi inlet conduit 70, the venturi throat 72, and the outlet conduit 74 for control purposes, described in greater detail below. Fluid from the outlet conduit 74 is delivered to a flow control valve 76 having a spring-loaded spool 78 forming a restrictive orifice 80 which communicates the conduit 74 with another conduit 82. Operation of the spring-loaded spool 78 provides generally constant volume flow, of for example, 7.5 gallons per minute, to the conduit 82. As the spool 78 is shifted rightwardly by increased flow from the conduit 74, excess fluid is communicated into another conduit 84 which is in communication with a variable flow relief valve 86. The variable relief valve 86 maintains a selected supply pressure within the conduit 84 for purposes described below while communicating excess fluid into one of a pair of conduits 88 and 90 which are in respective communication with the relief and replenishing valve group 52.

Excess or high temperature fluid from the relief and replenishing valve group 52 is also communicated through the conduit 90 to a pressure-responsive cooler by-pass and relief valve 92 which selectively directs the fluid either through a cooler 94 or a by-pass conduit 96 to a jet pump 98. The jet pump 98 also draws fluid from the multiple speed range transmission 26 through a conduit 100 with fluid passing through the jet pump 98 and the supplemental cooler 94 being reduced to a suitable temperature range before it is returned to the reservoir 56.

The various portions of the hydraulic supply and control circuit of FIG. 1, as described immediately above, combine to permit the separate pump 54 to supply the various fluid requirements for operation and regulation of the drive train. A more detailed description of those components is available in U.S. Pat. No. 3,877,224, issued Apr. 15, 1975, that patent being assigned to the assignee of the present invention.

The hydraulic circuit of FIG. 1 also includes a control valve assembly 102 which is in respective communication with the conduits described above and indicated respectively at 64, 66, 68, 82, 84, and 88. The valve assembly 102 is effective to communicate fluid signal through conduits 210 and 228 for operating the pump's servo 246 and actuator 42. The valve assembly 102 is also operable to develop fluid signals in additional conduits 108 and 110 which are in communication with the pilot motor or the valve 50 which in turn operates the actuator 44 for the hydrostatic motor 34. The various components within the control valve assembly 102 together with its mode of operation are described below with reference to FIG. 2 and composite FIGS. 4–12.

Figure 2:
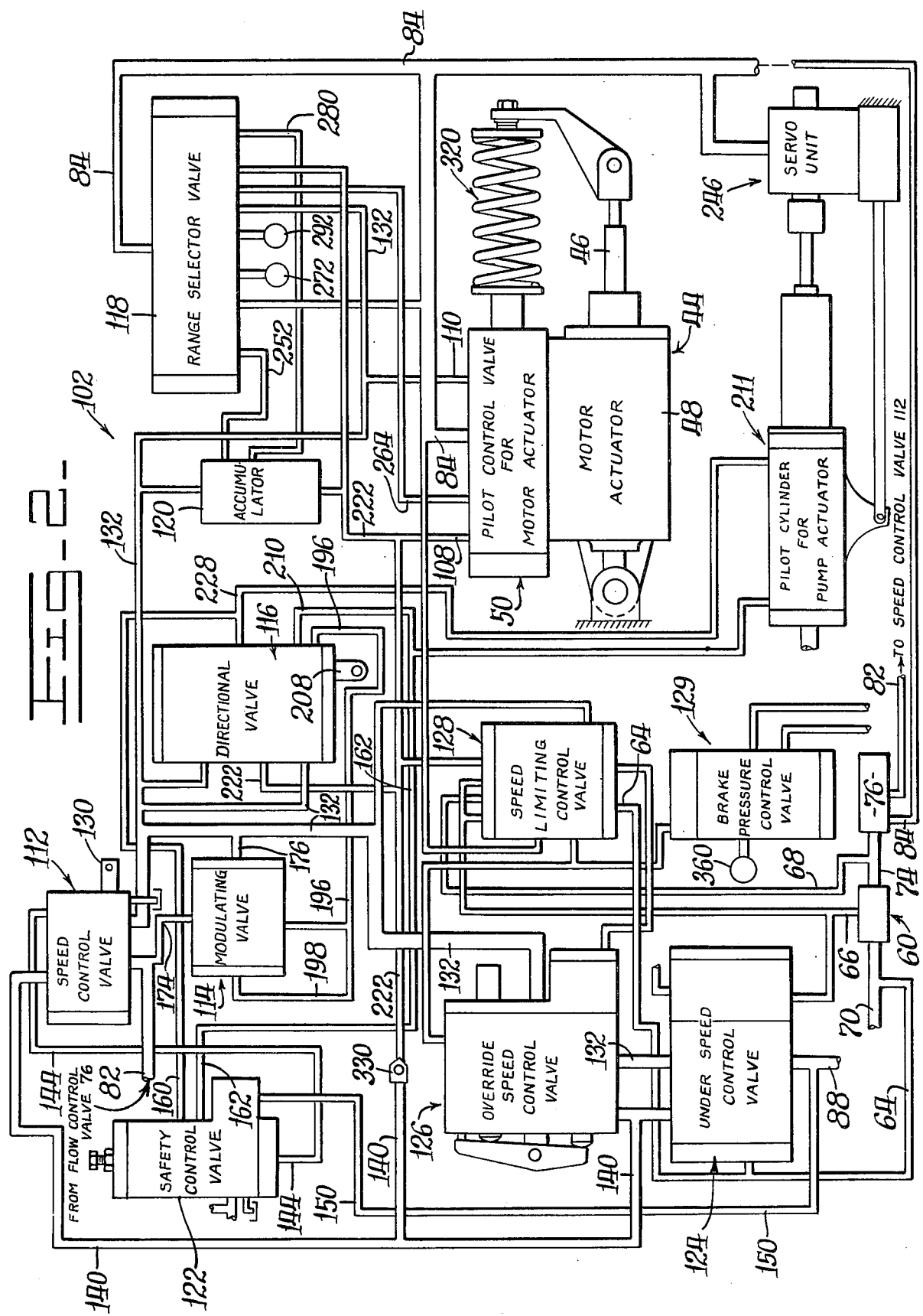
FIG. 2 is a schematic representation of a control group of elements within the hydraulic circuit for regulating operation of the two transmission units.
Figure 3:
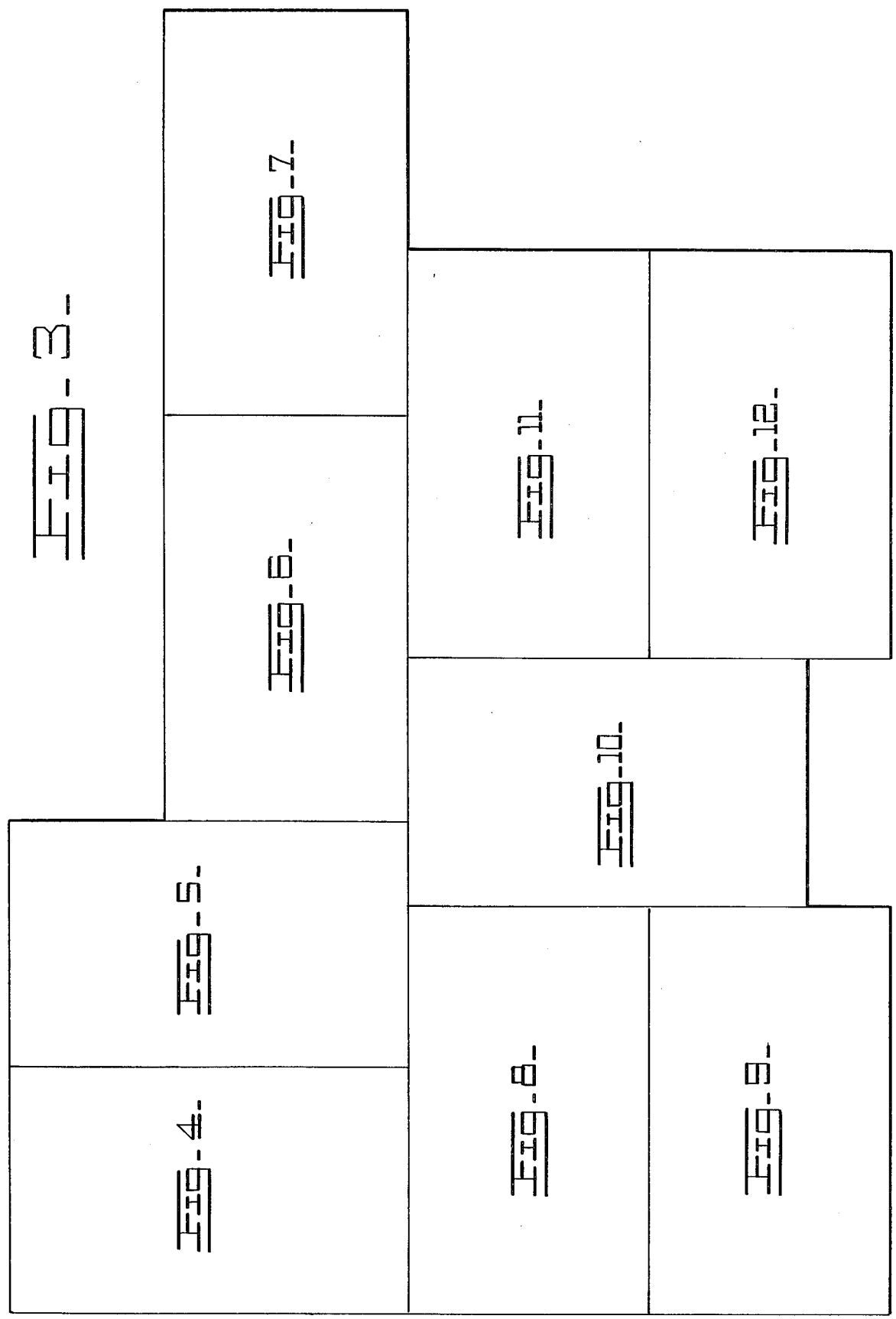
FIG. 3 illustrates the composite arrangement of FIGS. 4–12 to provide a more detailed representation, with parts in section, of the control assembly of FIG. 2.

(2) Summary of the Hydraulic Control Assembly Illustrated in FIG. 2 and in Composite FIGS. 4–12

Before proceeding with a detailed description of the construction and operation for the various valve components within the control valve assembly, the various functional purposes of the valve components may be summarized as follows. The relative location of the valve components within the control valve assembly may be best seen in FIG. 2 while the detailed construction of each valve component is illustrated within the composite FIGS. 4–12. The venturi unit 60, the flow control valve 76 and the hydrostatic motor actuator 44 which were described above in connection with FIG. 1, while not strictly a part of the control valve assembly, are nevertheless included within FIG. 2 and composite FIGS. 4–12 in order to better indicate the path of fluid flow into and through the control valve assembly 102.

As an initial element within the control valve assembly 102, a speed control valve 112 is manually operable by an operator to indicate a desired rate of operation for the drive train of FIG. 1 or its vehicle. The speed control valve accomplishes its function by generating a signal, preferably a differential pressure signal within a pair of conduits, as described in greater detail below, which varies for regulating operation of the hydrostatic transmission unit and the multiple speed range transmission unit after first being modified and controlled by other valve components within the control valve assembly.

A modulating valve 114 acts upon the variable signal generated by the speed control valve in order to regulate both the rate of increase for the signal, corresponding to acceleration of the drive train, as well as the rate of decrease for the signal which corresponds to deceleration of the drive train. The modulating valve 114 accomplishes both of these purposes by means of a common modulating orifice valve which will be described in greater detail below.

The modulated variable signal generated by the speed control valve 112 and adjusted by the modulating valve 114 is applied to the pilot control valves for the hydrostatic motor and pump actuators through a directional valve 116. The directional valve 116 preferably performs three basic functions. Initially, it establishes the direction of operation for the drive train by regulating the manner in which the modulated signal is communicated to the pilot control valves. Secondly, the directional valve includes means (described below) for closely regulating the sequence in which displacement variation of the hydrostatic pump and motor is to take place. Thirdly, the directional valve 116 establishes a selected rate of deceleration when the direction of operation is changed, that rate of deceleration being independent from the normal rate of deceleration established by the modulating valve 114.

A range selector valve 118 operates in response to the modulated variable signal from the speed control valve for automatically establishing one of the multiple speed ranges within the multiple speed range transmission unit 26 (See FIG. 1). Operation of the range selector valve for causing a shift between speed ranges is regulated by an accumulator 120 which also receives the modulated signal from the speed control valve 112 and the modulating valve 114.

The accumulator 120 also serves to absorb undesirable pressure surges in the modulated variable signal from the speed control valve 112 and the modulating valve 114, particularly during directional changes initiated by the directional valve 116 and speed range shifts initiated by the range selector valve 118 and accompanied by response of the pilot control valve 50 to reset displacement of the hydrostatic motor.

In connection with operation of the range selector valve 118, it is also important to note that the pilot control valve 50 for the motor actuator includes means responsive to shifting of the range selector valve for resetting displacement of the hydrostatic motor in order to permit its continued response to the modulated signal for further acceleration or deceleration in the new speed range. Preferably, resetting of the hydrostatic motor is accomplished without affecting the modulated signal from the speed control valve 112 and the modulating valve 114 in order to permit smoother operation of the hydrostatic transmission unit in conjunction with the multiple speed range transmission unit (See FIG. 1).

A safety control valve 122 preferably operates in conjunction with the speed control valve 112 and prevents development of a variable signal after start-up of the prime mover 22 (See FIG. 1) until the manual control element of the speed control valve 112 is first returned to a neutral setting. Thus, the safety control valve 122 assures that the control valve assembly 102 is properly conditioned to initiate accelerating operation of the transmission after start up.

A number of components within the control valve assembly 102 perform a generally common function of regulating operating speed of the prime mover 22 (See FIG. 1), particularly below or above a preselected operating speed range. Initially, an underspeed control valve 124 functions to adjust the modulated variable signal from the speed control valve 112 and the modulating valve 114 when the operating speed of the prime mover 22 is below a preselected level. Thus, when the transmission is operating under heavy load conditions, its torque load is reduced in order to permit the operating speed of the prime mover to return to a satisfactory range.

An override speed control valve 126 acts upon the modulated variable signal from the speed control valve 112 and the modulating valve 114 in substantially the same manner as the underspeed control valve but under manual control in order to enable an operator to selectively reduce the operating speed of the drive train. The particular manner in which this function is accomplished does not require resetting of the speed control valve so that a preselected speed setting may be maintained within the speed control valve. Additionally, the override speed control valve 126 permits a feedback function discussed immediately below in connection with a speed limiting control valve 128.

The speed limiting control valve 128 performs the basic function of generating a signal for the purpose of applying a brake within the drive train whenever the operating speed of the prime mover 22 exceeds a preselected maximum value. Thus, when the prime mover 22 tends to be driven in operation through the drive train, for example, when a vehicle is travelling downhill, the operating speed is automatically limited at generally the setting established by the speed control valve 112.

The speed limiting control valve 128 performs an additional function in conjunction with the manually operable override speed control valve 126. Normally, overspeeding of the prime mover 22 occurs when an operator is attempting to reduce operating speed of the drive train or vehicle through manipulation of the override speed control valve 126. Accordingly, the speed limiting control valve is designed to generate a feedback signal which resists manual operation of the override control valve 126 in order to indicate to the operator the degree of engagement for the brakes within the drive train. Thus, the override speed control valve 126 may be freely adjusted by its manually controlled element to employ dynamic braking capacity within the hydrostatic transmission unit for reducing speed of the drive train. However, when the speed limiting control valve initiates engagement of the supplemental brakes within the drive train, the degree of engagement for the supplemental brakes is thus signalled to the operator so that he is aware of their use in decelerating the drive train. The feedback signal generated by the speed limiting control valve is adjusted in response to engagement pressure of the brake as well as operating speed of the prime mover and output operating speed of the drive train in order to provide a true indication to the operator as to the amount of supplemental braking being provided by the brakes.

Finally, the brake pressure control valve 129 functions in response to the brake engagement signal from the speed limiting control valve 128 in order to selectively pressurize or engage the brake within the drive train. Preferably, the brake pressure control valve 129 is adapted to communicate actuating pressure for the brake from one of the hydrostatic manifolds, whichever is at a higher pressure.

It may be seen from the above summary that the underspeed control valve 124, the override speed control valve 126 and the speed limiting control valve 128 function in combination to automatically regulate operating speeds for the drive train. Operation of the underspeed control valve 124 is relatively conventional. However, the valve components 126 and 128 novelly permit the employment of dynamic braking capacity of the hydrostatic transmission to the fullest extent possible, thereafter computing the amount of supplemental braking capacity required to maintain operation of the prime mover within acceptable limits. This computing function extends further to generation of the feedback signal discussed above in order to signal the operator as to the amount of supplemental braking capacity being employed within the drive train. These functions for the valve components 126 and 128 may readily be accomplished by means other than the hydraulic valves illustrated and described. The use of an electronic control circuit is particularly suggested for this purpose.

(3) DETAILED DESCRIPTION OF THE CONTROL VALVE ASSEMBLY 102

A complete representation, including cross-sectional views of the various valve components in the control valve assembly 102, is provided by composite FIGS. 4–12. Fluid is supplied at a constant volume flow rate from the venturi 60 through the flow control valve 76 (FIG. 1) to the control valve assembly 102 through the conduit 82.

Pressurized fluid necessary for operation of the hydraulic actuators which vary displacement of the pump 32 and motor 34 and which engages the clutches of the multiple speed range transmission unit enters the control valve assembly through the conduit 84.

Fluid in conduit 82 is communicated to the speed control valve 112. The valve 112 produces a differential pressure signal for actuating or regulating other components in the control assembly 102. When a manual control spool 130 is in a neutral position (analogous to the zero speed position shown in FIG. 5) within the valve 112, fluid passes freely into another signal conduit 132 for passage through the valve 126 and 124 before returning to the relief and replenishing circuit, as illustrated in FIG. 1.

Figure 5:
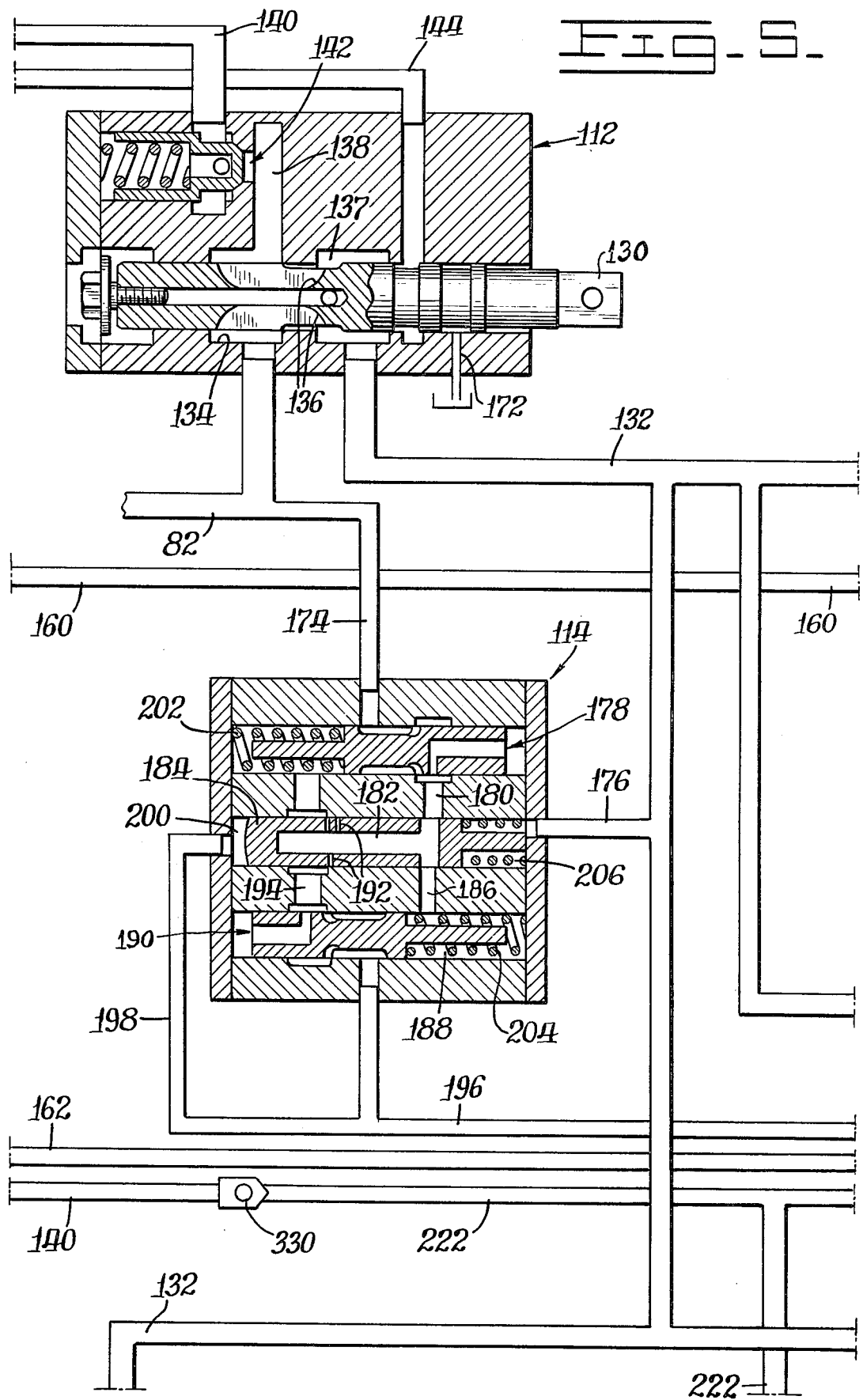
FIG. 5, within the composition figure, includes a speed control valve and a modulating orifice valve.
Figure 6:
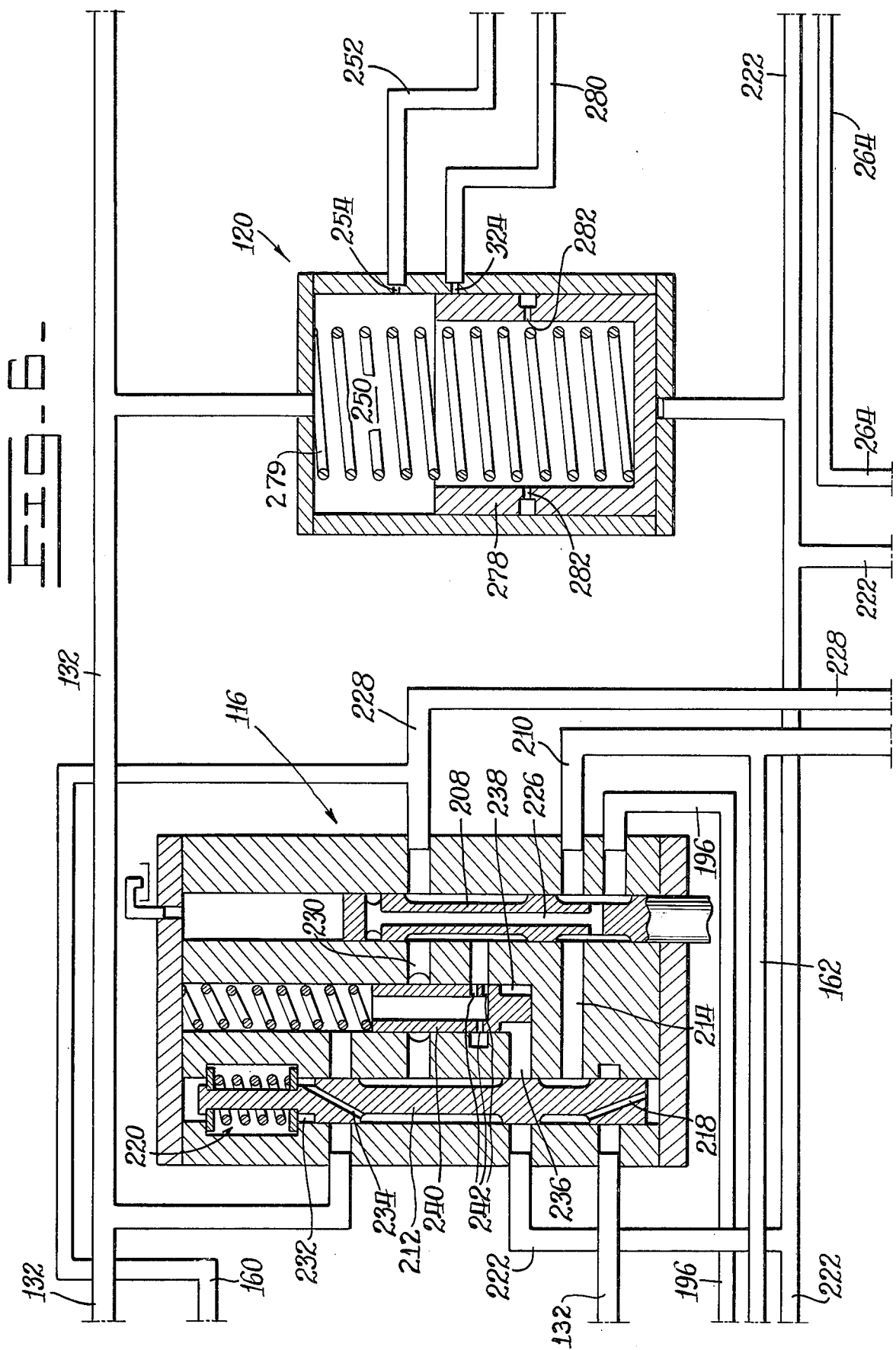
FIG. 6, within the composition figure, includes a directional valve and a fluid accumulator.

The valve 112 is illustrated in greater detail in composite FIG. 5. Fluid enters the valve 112 from the conduit 82 and flows through an annular groove 134 and a pair of metering slots 136 on the spool 130, an annular recess 137 in the valve 112 and then into the conduit 132. When the spool 130 is shifted rightwardly, the slots 136 restrict flow thereacross so that pressure rises in the conduit 82.

A passage 138 in the valve 112 communicates the conduit 82 with conduit 140 through a check valve 142 for communication to the valves 126 and 124 for a purpose described below.

When the spool 130 of the speed control valve 112 is shifted leftwardly, low pressure signal fluid from the conduit 132 is directed to a conduit 144 in communication with the end of a spool 146 (See FIG. 4) reciprocably located in the safety control valve 122. The reset function of the valve 122 is initiated when the spool 146 is thus shifted upwardly against a spring 148. Pressure from the conduit 88 in a branch conduit 150 and passage 152 is thereby communicated across a groove 154 in the spool 146 to a conduit 156 which releases the parking brake 158 and delivers pressurized fluid to the pilot stage of relief and replenishing valve 52 via a conduit 157, (also see FIG. 1). The conduit 157 serves to vent the relief and replenishing valve group at the same time that the parking brake 158 is applied. In addition, communication between conduits 160 and 162 is blocked for a purpose described below.

As the spool 130 of the valve 112 is shifted rightwardly toward its maximum speed control position, it blocks conduit 144 which remains pressurized by fluid from the groove 154 flowing through an orifice 164 in order to maintain the spool 146 shifted upwardly against the spring 148. If a malfunction should occur within the control system, causing a lowering of pressure in the conduit 150, the spring 148 would then move the spool 146 downwardly toward its vent position while fluid in the conduit 144 generally escapes past a narrow land below groove 166 and thence into a drain conduit 168 to provide a timed delay before the parking brake is allowed to engage.

The time delay feature is provided to prevent minor pressure fluctuations from affecting operation of the safety control valve 122. A check valve 170 prevents excess pressure from escaping the conduit 144 into the conduit 150.

When the spool 130 of the valve 112 is moved completely to the left, the conduit 144 is communicated to a drain conduit 172 which enables the spool 146 to be moved downwardly by the spring 148, thus venting the transmission and applying the parking brake.

When fluid pressure enters the conduit 82, it also flows into the modulating valve 114 through a branch conduit 174 while lower pressure signal fluid in the conduit 132 is directed to that valve through a conduit 176 by operation of the valve 112 as described above.

The pressure of fluid entering the modulating valve 114 is initially adjusted by a pressure regulating reducing valve 178 and communicated to a passageway 180. Fluid under pressure in the passage 180 is communicated into a chamber 182 in a modulating orifice valve spool 184 and another passage 186. The passage 186 communicates with a spring chamber 188 for a second pressure regulating reducing valve 190 which is thereby responsive to pressure established by the first pressure regulating valve 178 in the passage 180. Fluid from the chamber 182 passes through modulating orifices 192 into a passage 194 and then across the pressure regulating valve 190 into a high pressure signal conduit 196.

A branch conduit 198 directs high pressure signal fluid from the conduit 196 into a chamber 200 located on the left end of the modulating spool 184. At the same time, low pressure signal fluid from the conduit 176 biases the modulating spool 184 so that it is thus responsive to the same differential pressure applied to the pilot operated actuators 42 and 44 for the hydrostatic pump and motor, as will be described in greater detail below, the differential pressure thus being a function of output speed of the drive train.

The valve 114 modulates or adjusts pressure in the conduit 196 for regulating the flow rate into and out of the spring-loaded pump pilot cylinder 211 and accumulator 120. Spring characteristics within the accumulator 120 and pilot cylinder 211 are selected so that, as pressure in the conduit 196 increases, the pump pilot cylinder 211 moves first, the accumulator 120 moving second in unison with the motor actuator 44. Thus, increased pressure in the conduit 196 results in an increase in output speed for the drive train.

In summary, the steady-state pressure level in the conduit 196 is determined by the instant setting for the valve 112 while the valve 114 modulates the transition or rate of pressure change in the conduit 196 from one level to another.

Because of the opposed arrangement of the pressure regulating valves 178 and 190, they operate in conjunction with the single modulating valve spool 184 to regulate fluid flow in either direction between conduits 174 and 196, thus establishing the rates of both acceleration and deceleration for the hydrostatic transmission. The pressure regulating valves 178 and 190 operate in conjunction with the modulating valve spool 184 to establish a fixed pressure drop regardless of pressure fluctuations caused primarily by manual operation of the spool control valve 112 so that the instantaneous rate of acceleration or deceleration is the same at any given speed of operation.

The novel construction of the modulating valve assembly 114 also permits three separate and independent adjustments-corresponding to acceleration rate, deceleration rate and the characteristic rate change for the modulating valve 184- for example, by adjusting or changing the biasing force acting on each of the regulating valves 178 and 190 and the modulating valve spool 184 by means of their respective springs 202, 204, and 206.

The conduit 196 communicates high pressure signal fluid to a directional control valve 116 which determines the direction of travel for the drive train by varying the direction in which displacement of the hydrostatic pump 32 occurs.

Low pressure signal fluid is also communicated to the valve 116 through the conduit 132.

The position of a manually adjustable spool 208 determines the direction of travel for the drive train. For forward operation, the spool 208 is shifted to the position illustrated in the composite FIG. 6. High pressure signal fluid in the conduit 196 is then communicated through conduit 210 to one end of a pilot control cylinder 211 for regulating the pump actuator 42 (also see FIG. 1). The cylinder 211 includes a piston 213 acted upon by opposed centering springs 215 and 216.

Figure 4:
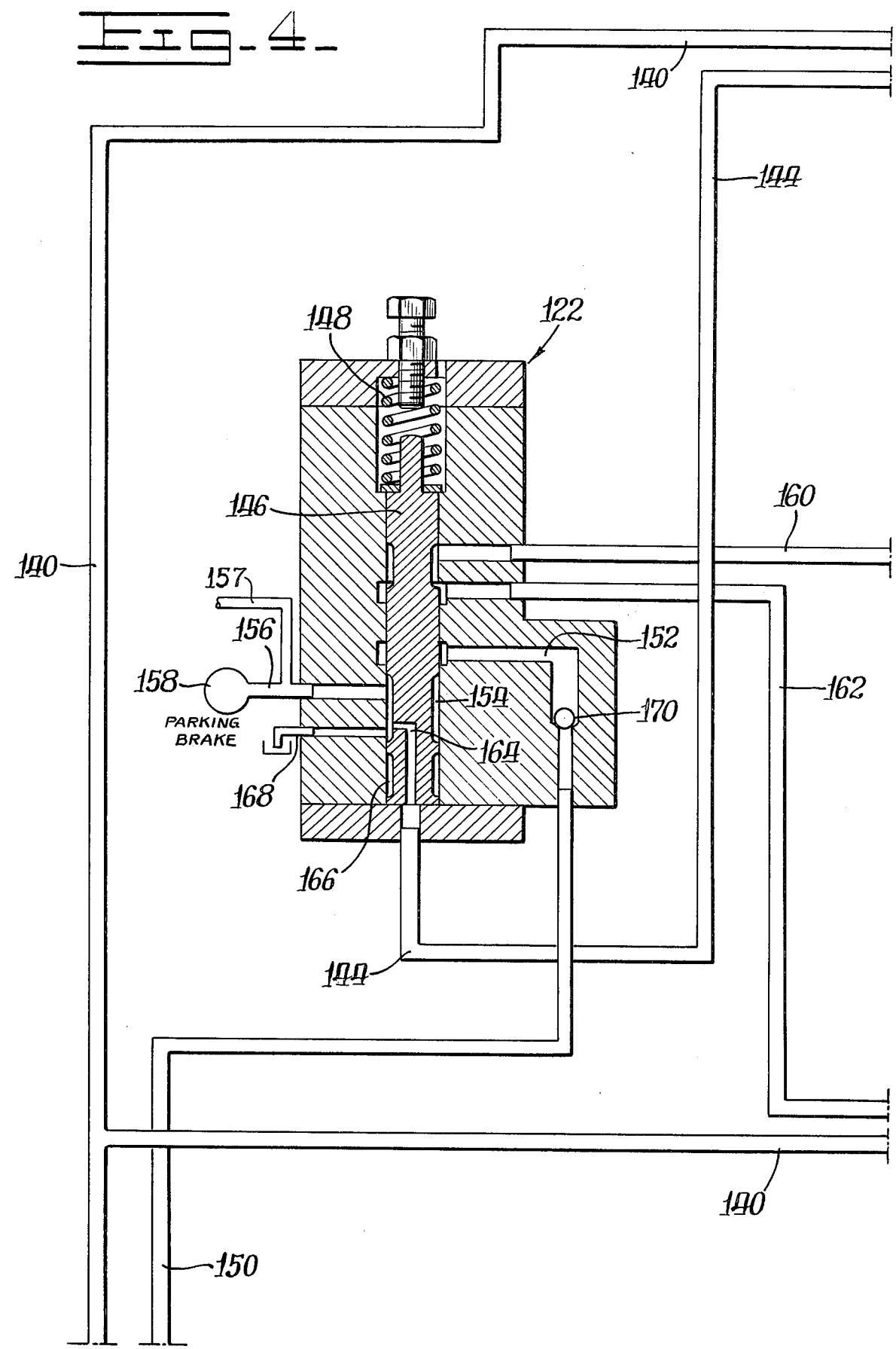
FIG. 4, within the composition figure, includes a safety reset valve.

With the spool 146 of the safety control valve 122 shifted upwardly, the conduit 162 is blocked from the conduit 160 to permit pressurization of the conduits 210 and 162 (see FIG. 4).

The directional valve 116 (see FIG. 6) also contains a sequencing spool 212 which shifts to direct pressurized fluid to the pilot valve 50 for the hydrostatic motor 34. The motor 34 is, of course, not reversible like the hydrostatic pump 32. When the spool 208 shifts (to the position shown) to pressurize the conduit 210, it also communicates high pressure signal fluid through a passage 214 to the sequencing valve spool 212. Fluid flow through a passage 218 in the spool 212 shifts the spool upwardly against the centering spring assembly 220. The passage 214 is thus communicated with a conduit 222 which leads to the pilot control valve 50 for the hydrostatic motor, the accumulator 120 and the range selector valve 118 (see FIG. 7).

When the spool 208 is shifted downwardly, corresponding to reverse operation, pressurized fluid in the conduit 196 is transmitted through an axial passage 226 in the spool to a conduit 228. Pressurization of the conduit 228 transmits fluid to the opposite end of the pump pilot cylinder 211 in order to shift the pump 32 in the opposite direction. However, since the conduit 228 is in communication with a passage 230 leading to the sequencing valve spool 212, high pressure signal fluid is also communicated to a chamber 232 at the top of the spool 212 by means of a passage 234. The spool 212 is thus shifted so that the passage 230 communicates with the conduit 222 for the motor pilot valve 50.

Regardless of the direction in which the spool 208 is shifted, pressure in either passage 214 or 230 is also directed to a passage 236 and a chamber 238 to act upon a spool 240 containing variable orifices 242.

During the deceleration portion of a forward-reverse shift which is initiated by the directional spool 208, the spool 212 maintains its position until pressure acting on either end of the spool diminishes. Thus, fluid escaping from the pump pilot cylinder in conduit 210 must flow through the variable orifices 242 thence to the low pilot pressure conduit 132. The variable orifices 242 are controlled by vehicle speed, as represented by pressure in the passage 236, in order to provide a programmed rate of deceleration only during directional shifts. The sequencing spool 212 subsequently shifts back to its centered position so that subsequent acceleration, in reverse, is again regulated by the modulating valve assembly 114.

As indicated above, conduit 210 communicates pressurized fluid to the pump pilot cylinder 211, which acts upon a servo actuator valve 246 (see FIG. 12) so that a servo-coupled valve spool 244 is shifted to direct fluid from the conduit 84 to the actuator cylinder 247. The cylinder 247 is part of the actuator 42 for the hydrostatic pump 32.

As pressure increases in the conduit 210, the piston 213 moves rightwardly against the spring 215 and fluid pressure from the conduit 228 which is connected to the low pressure pilot signal conduit 132. As the piston 213 is shifted rightwardly, the spool 244 also moves rightwardly. Fluid pressure is directed from the conduit 84 through the passage 217 to the chamber 219 in order to move the piston 221 leftwardly. The cylinder 211 is thus moved leftwardly in order to adjust pump displacement. The piston 213 is thereby shifted leftwardly in order to block the conduit 84 from the passage 217 and limit leftward movement of the cylinder 211. The servo actuator functions in a similar manner in reverse. For example, pressure in the conduit 228 is then increased in order to shift the piston 213 against the spring 216 and the relatively low signal pressure from the conduit 210.

As the high pressure signal fluid is increased by the speed control valve 112, displacement of the pump is first varied. As the pump approaches maximum displacement, further pressure increases are communicated across the sequencing spool 212 to shift a spool 248 of the motor pilot valve 50 (see FIG. 11) which in turn directs fluid from the conduit 84 to the motor actuating cylinder in order to change displacement of the motor, as described in greater detail below.

Figure 7:
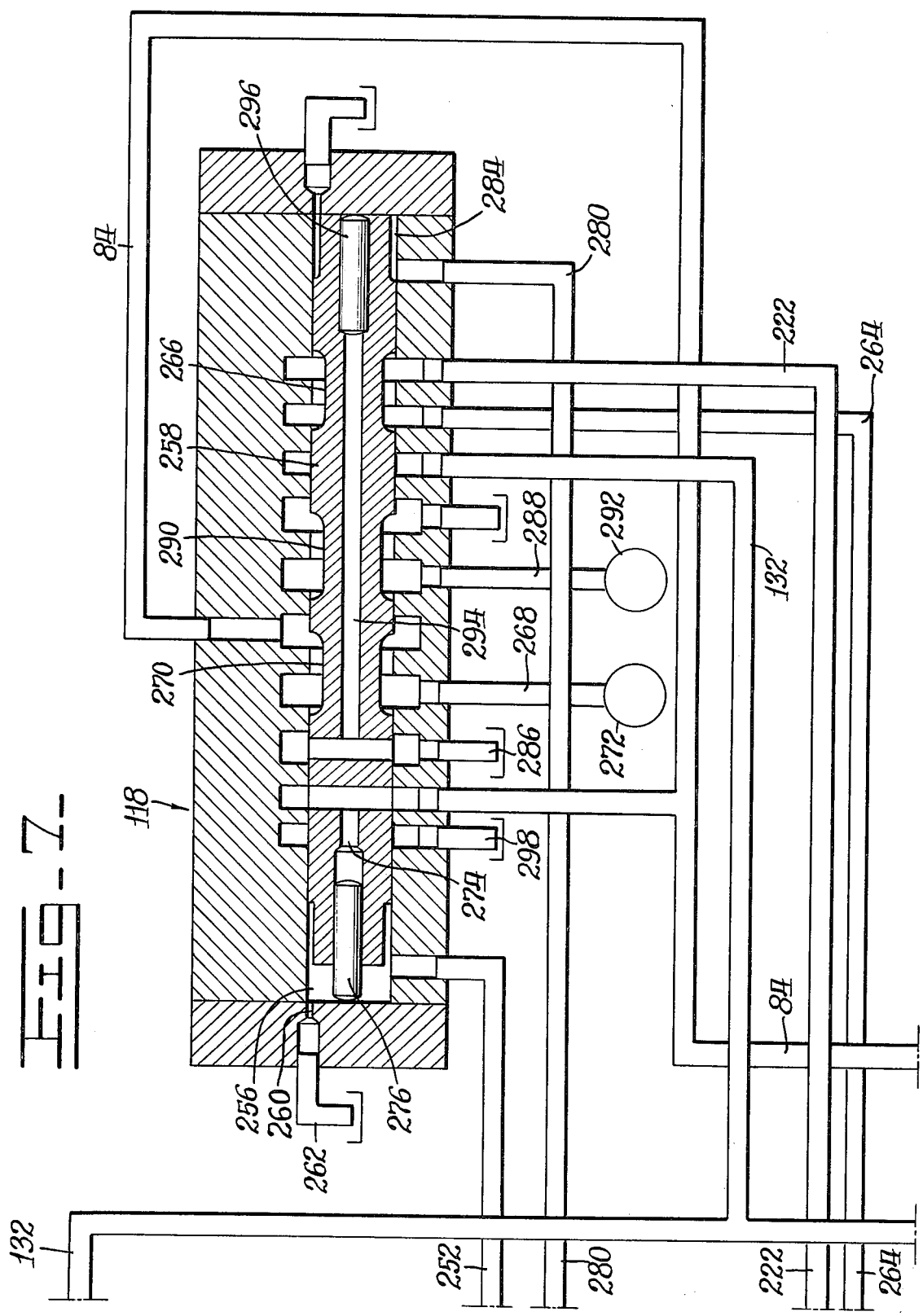
FIG. 7, within the composition figure, includes a range selector valve.

The range selector valve 118 (see FIG. 7) functions automatically to shift speed ranges as the motor approaches minimum displacement or maximum speed. Low pressure signal fluid in the conduit 132 is communicated to a chamber 250 of the accumulator 120 (see FIG. 6). That chamber is also communicated to a conduit 252 by means of an orifice 254. The conduit 252 leads to a chamber 256 at the left end of a spool 258, as seen in FIG. 7, reciprocably located in the range selector valve 118. An orifice 260 in a drain passage 262 permits pressurization of the chamber 256 which shifts the spool 258 rightwardly to the position shown.

Once the spool 258 is moved rightwardly, pressure is communicated from the conduit 222 into a conduit 264 across a groove 266 formed on the spool 258. Also, with the spool in that position, fluid under pressure from the conduit 84 is directed to a conduit 268 across a groove 270 on the spool 258 in order to direct fluid under pressure to engage a low range clutch 272 of the multiple speed range transmission 26 (also see FIG. 1). Supply fluid from the conduit 84 is also directed to a chamber 274 and acts between a slug 276 and the spool 258 in order to assist in maintaining 258 in its rightwardly shifted position.

As the speed control valve spool is moved further toward the right, increasing signal fluid pressure develops in the conduit 222 which is communicated to the accumulator 120 and the motor pilot valve 50. As the pressure in the conduit 222 increases, it shifts a piston 278 upwardly in the accumulator 120 against a spring 279, FIG. 6. The piston moves upwardly until the chamber 250 is communicated with a conduit 280 by orifices 282 in order to pressurize a chamber 284 at the right end of the spool 258. Pressure in the chamber 284 acts upon the spool 258 and shifts it to the left. This occurs because the piston 278 in the accumulator 120 moves upwardly to block the line 252, thereby allowing fluid pressure in the chamber 256 to escape through the drain line 262.

When the spool 258 shifts leftwardly, the conduit 268 is communicated to a drain conduit 286 across the groove 270 while a conduit 288 is communicated with the fluid supply conduit 84 across a groove 290 on the spool 258. Thus, the low range clutch 272 is deactuated and a high range clutch 292 is simultaneously engaged. Also, fluid pressure from the conduit 84 is communicated to a passage 294 in the spool 258 in order to work against a slug 296 and assist in holding the spool 258 in its leftwardly shifted position. The chamber 274 is simultaneously vented to a drain line 298.

Accordingly, to summarize accelerating operation, the multiple speed range transmission is initially in a low speed range and, as speed increases, the increasing differential pressure in the signal conduits first shifts the pump pilot valve to increase the pump 32 from zero toward maximum displacement. After the pump reaches maximum displacement, further increases in the differential pressure begin to shift the motor 34 from maximum displacement toward a minimum displacement condition.

In order to further increase operating speed, increasing differential pressure shifts the multiple speed range transmission unit from low to high range operation as described above, while at the same time shifting the motor displacement back toward maximum displacement as described below. After the high range clutch 292 is engaged, further increases in differential pressure again cause the motor to shift from maximum toward minimum displacement.

Rapid shifting of the motor from the minimum to maximum displacement is accomplished as follows: The motor pilot valve 50 and hydraulic actuator 44 are shown in detail on FIG. 11. As stated, high pressure signal fluid is communicated through the conduits 222 and 264, leading to the left end of the pilot valve 50. Low pressure signal fluid is directed to the right end of the pilot valve through the conduits 132 and 110. The conduits 222 and 108 connect with a chamber 300, formed in a piston 302 by means of a passage 304 in the pilot valve, a passage 308 formed in the spool 248 and a passage 306 formed in the piston 302. The conduit 264 is in similar communication with a chamber 310 formed in the spool 248. Pressure in the chamber 300 acts against the left end of a plunger 312. The plunger 312 also has its right end in contact with the spool 248. The combination of forces developed in the chambers 300 and 310 is counteracted on the opposite end of the spool 248 by low pressure signal fluid communicated from the conduit 110 and acting in a chamber 314 formed between a piston 316 and the spool 248. Rightward travel of the piston 316 is limited by a fixed pin 318. The spool 248 is also urged leftwardly by a spring pack 320 located at the right end of the spool 248 (see FIG. 2).

Increasing pressure in the chambers 300 and 310 eventually causes the spool 248 to move rightwardly so that actuator supply fluid from the conduit 84 is directed to a chamber 322 in the motor actuator 44. The motor actuator piston rod 46 moves to the left (see FIG. 11) and changes displacement of the motor 34. The spring 320 is thus compressed to balance a higher pressure in chambers 300 and 310. When the forces on the spool 248 are balanced, the spool returns to its center position, shown in FIG. 11, and the motor ceases to change position. This incremental operation occurs for every incremental increase of signal fluid pressure, until the hydrostatic motor is shifted to a minimum displacement setting, in order to provide maximum output speed in a given speed range.

At the same time increasing fluid signal pressure in the conduit 222 is communicated into the bottom of the accumulator 120 as the hydrostatic motor 34 is shifted toward minimum displacement, the passages 282 in the accumulator piston 278 begin to enter into communication with the conduit 280 through an orifice 324. Thus, the accumulator provides precise timing for directing low pressure signal fluid into the conduit 280 in order to shift the range selector valve spool 258 leftwardly for disengagement of the low speed clutch 272 and engagement of the high speed clutch 292. This function was also described above. However, at the same time, the conduit 264 which previously contained high pressure signal fluid is communicated with the low pressure signal fluid conduit 132 by means of the groove 266 formed on the right end of the spool 258. The resulting reduction of pressure in the conduit 264 is also immediately reflected within the chamber 310 in the pilot valve 50 so that substantially constant pressure within the chamber 314 shifts the spool 248 leftwardly. Thus, the pilot valve 50 directs actuating fluid pressure from the conduit 84 into a chamber 326 at the head end of the motor actuator 44 in order to rapidly shift the motor back toward a position of maximum displacement.

After the motor is rapidly shifted back toward its position of maximum displacement as described above, the pilot valve 50 continues to respond to further incremental increases in the differential signal pressure to again shift the motor toward a condition of minimum displacement in order to provide acceleration in the high speed range.

It is particularly important to note that the motor 34 is shifted back to its position of maximum displacement by means independent of pressure in the signal conduits 222 and 132. Rather, the motor is merely shifted by effectively reducing pressurization in the chamber 310 of the motor pilot valve 50. Pressure escaping from the chamber 310 may be absorbed within the accumulator 120 so that is does not affect any other portion of the control valve assembly. Consequently, a shift from low to high operating speed range does not result in uneven operation for the drive train since it is not necessary to generate a conventional underspeed signal when the drive train is shifted into its high operating speed range.

The remaining portion of the description for the control valve assembly 102 is directed toward the valve components 124, 126, 128 and 129 which function to automatically regulate the differential signal pressure within the control assembly 102 and thus operating speed limits for the drive train.

The underspeed control valve 124 corresponds generally in function and mode of operation with a similar underspeed control valve (80) described in U.S. Pat. No. 3,477,225, assigned to the assignee of the present invention. Accordingly, the construction and mode of operation for the underspeed control valve 124 is only briefly described below. High pressure fluid from the conduit 140 is in communication with a passage 328 in the valve 124. It is also important to note that the conduit 140 is in communication with the high pressure fluid signal conduit 222 by means of a check valve 330 (see composite FIG. 5 and FIG. 2). Generally, the underspeed control valve functions in response to operation of the prime mover 22 below a predetermined minimum value in order to communicate the conduit 140 and accordingly the high pressure signal conduit 222 with the low pressure signal conduit 132 and its downstream conduit 88. The underspeed control valve performs this function in response to a fluid signal received from the venturi unit 60 through the venturi signal conduits 64 and 66. Note that the pressure differential between those two conduits is representative of operating speed for the prime mover 22.

The underspeed control valve 124 includes a metering spool 332 for regulating fluid communication from the conduit 140 and passage 328 into another branched passage 334 in communication with the low pressure conduits 132 and 88. Fluid pressure from the venturi signal conduit 64 is communicated through a passage 336 to act against the left end of the spool 332. Similarly, fluid from the venturi signal conduit 66 is communicated through a passage 338 into a spring chamber at the right end of spool 332.

Figure 9:
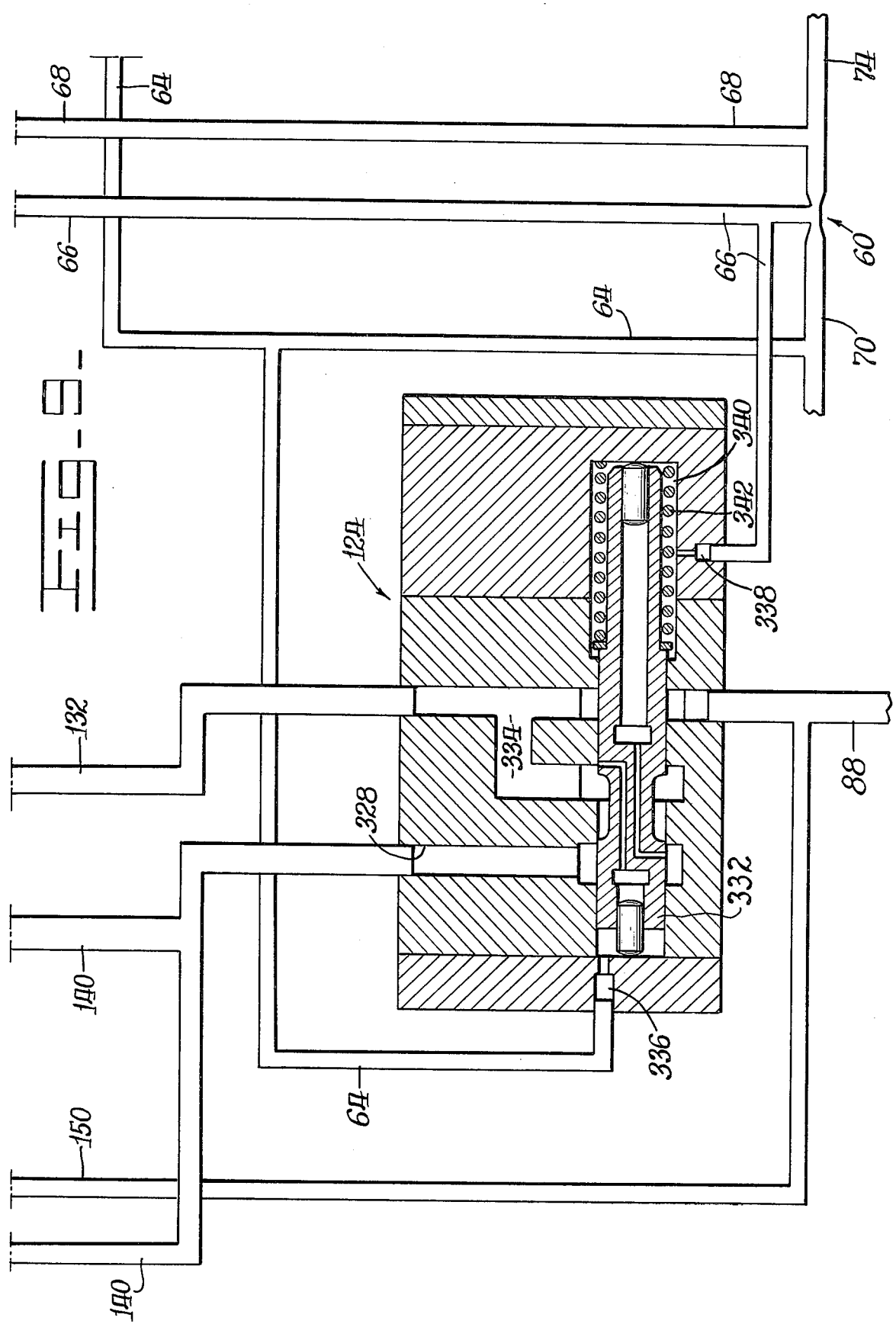
FIG. 9, within the composition figure, includes an underspeed control valve.
Figure 10:
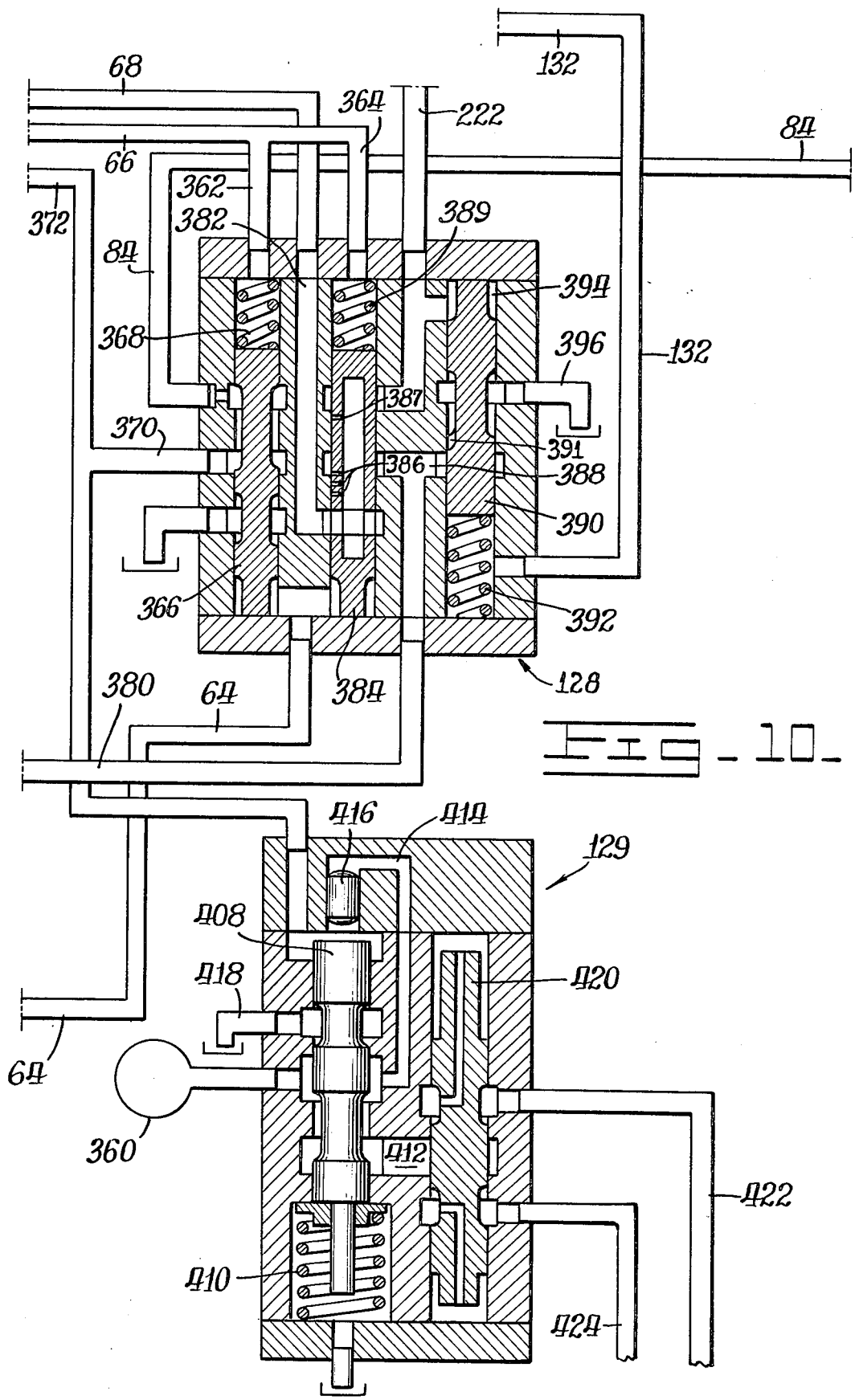
FIG. 10, within the composition figure, includes an overspeed control valve and a brake pressure control valve.
Figure 11:
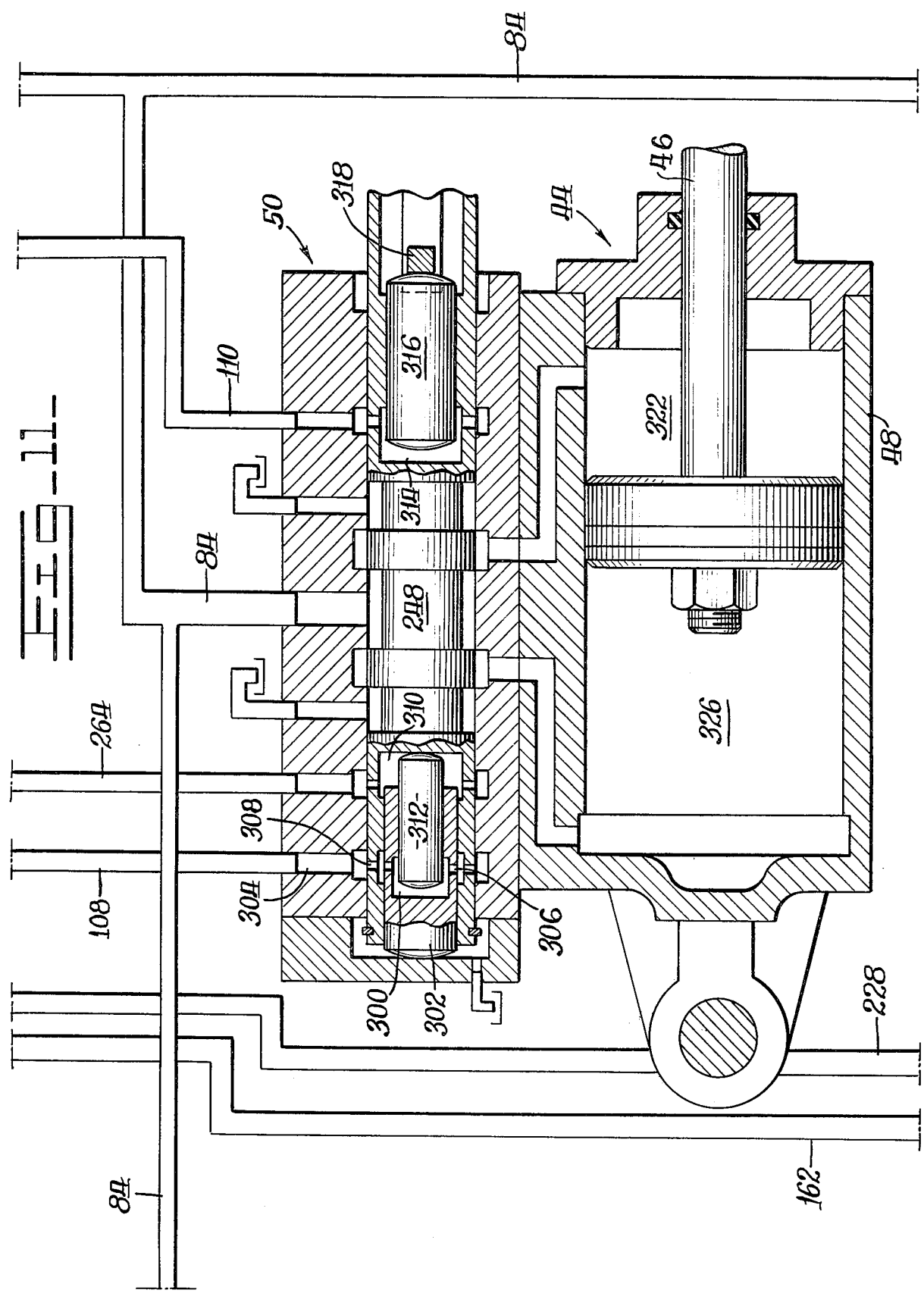
FIG. 11, within the composition figure, includes a portion of the displacement actuator for the hydrostatic motor together with a pilot motor for operating the motor actuator.
Figure 12:
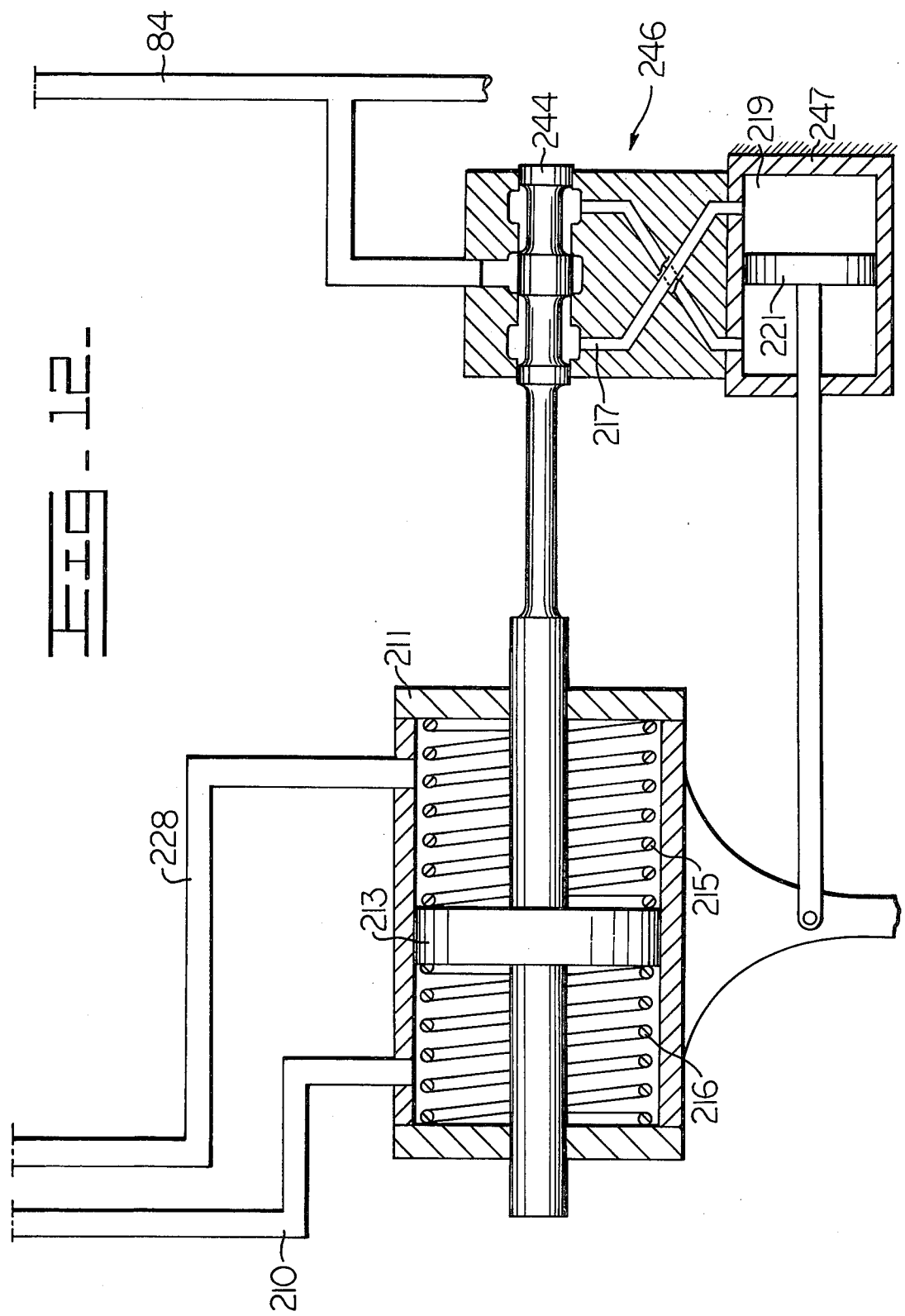
FIG. 12, within the composition figure, includes a pilot motor and associated actuator for the hydrostatic pump unit.

During relatively high speed operation of the prime mover, pressure in the signal conduit 66 is relatively low so that the spool 332 remains shifted toward the right, in the position illustrated in FIG. 9, by pressure from the signal conduit 64. However, as operating speed of the prime mover decreases below a predetermined minimum value, pressure in the conduit 66 increases in relation to pressure within the conduit 64. Accordingly, fluid pressure in the chamber 340 combines with force of the spring 342 to shift the spool 332 leftwardly and relieve some of the fluid pressure from the conduit 140 and accordingly, from the high pressure signal conduit 222, thus allowing the pump or motor to effectively reduce the output speed of the vehicle. This, of course, reduces torque loading on the prime mover 22. When operating speed of the prime mover recovers, pressure in the venturi signal conduit 66 diminished, permitting the spool 332 to be shifted rightwardly so that a differential pressure may again be developed within the conduit 222.

The override speed control valve 126 also receives high pressure fluid through the conduit 140 from the speed control valve 112. Low pressure signal fluid is also communicated across the valve 126 by means of the conduit 132 as noted above.

The purpose of the override speed control valve 126 is to permit an operator to selectively reduce operating speed of the drive train (see FIG. 1) without necessarily adjusting or resetting a speed control valve 112. This feature is of course of particular value in material handling vehicles where an operator is busy manipulating implements as well as regulating the operating speed and the direction of the vehicle. Accordingly, the override speed control valve 126 permits him to establish a desired operating speed by means of the speed control valve 112 and to maintain that setting while intermittently reducing operating speed through use of the valve 126.

Figure 8:
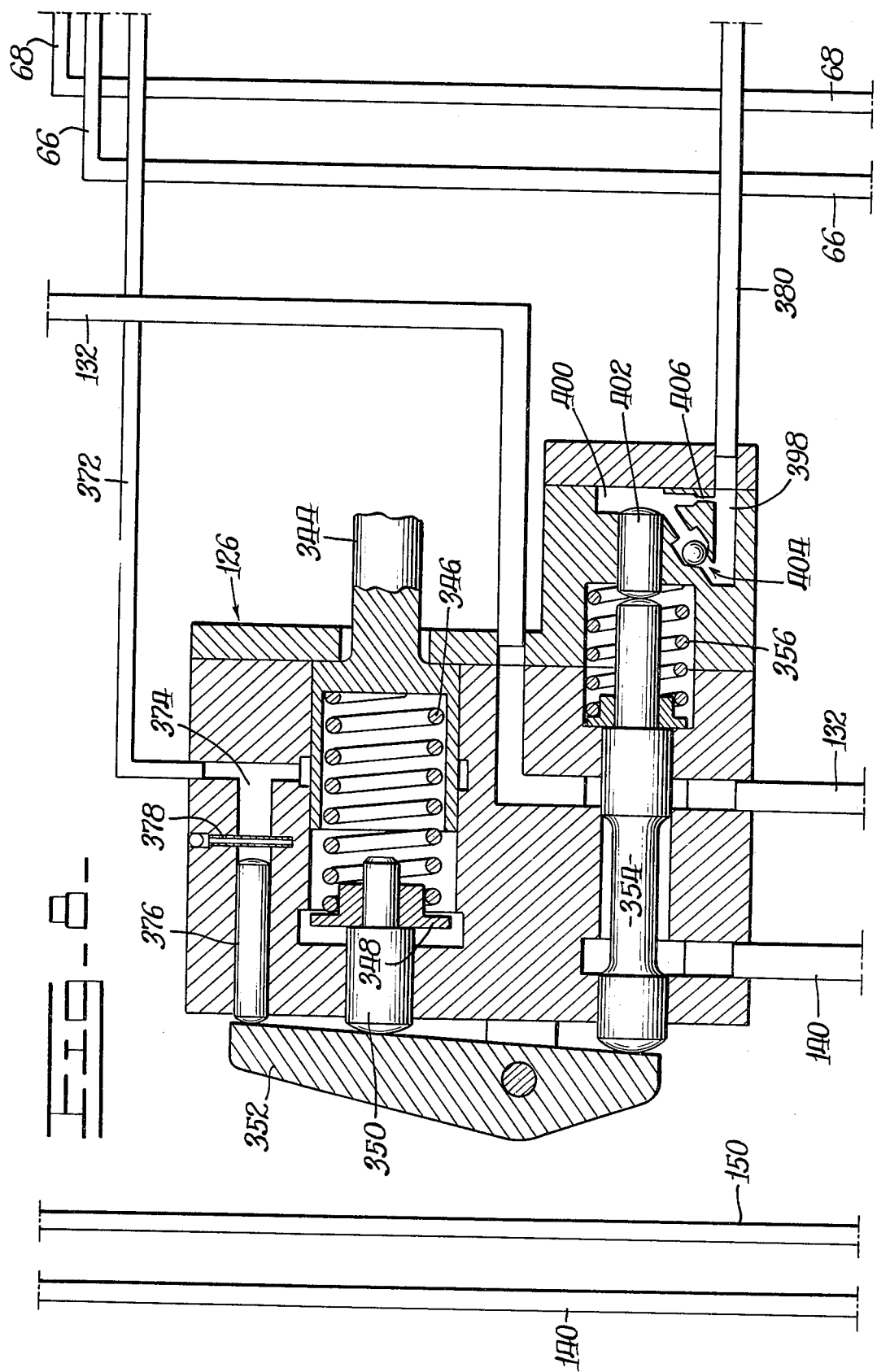
FIG. 8, within the composition figure, includes an override speed control valve assembly.

The operator may selectively reduce operating speed by manually shifting a control rod 344 leftwardly to compress a spring 346 (see FIG. 8). Compression of the spring 346 acts through an adapter 348 and a piston 350 against a pivoted lever 352. Resulting movement of the lever 352 urges a spool 354 rightwardly against its spring 356 in order to communicate relatively high pressure fluid from the conduit 140 to the low pressure conduit 132. As noted above, this permits high pressure signal fluid from the conduit 222 to escape through the check valve 330, thereby reducing the differential pressure in the signal conduits 132 and 222 in order to reduce operating speed of the drive train.

During operation of the override speed control valve 126 in the manner described above, the prime mover is often subjected to overspeed conditions while attempting to provide necessary dynamic braking through the hydrostatic transmission. This condition occurs for example when the vehicle is operating at a high rate of speed or when the vehicle is traveling downhill. At such times, the dynamic braking capacity of the prime mover and hydrostatic transmission may be insufficient to decelerate the vehicle at the desired rate. Accordingly, the present invention contemplates supplemental brakes which are automatically operated to supply additional braking capacity in response to operating conditions within the drive train.

In order to prevent such overspeeding, the speed limiting control valve 128 (see FIG. 10) is selectively operable in a manner described immediately below to cause variable engagement of brake 360 within the drive train 20. The brake 360 is schematically represented on FIG. 10 in conjunction with the brake pressure control valve 129.

The speed limiting control valve receives a low pressure signal from the venturi signal conduit 66 through branched conduits 362 and 364. The valve 128 also receives an inlet pressure signal from the venturi unit 60 by means of the signal conduit 64. It is again important to note that the signal received from the signal conduits 64 and 66, in combination, provide an indication of operating speed for the prime mover 22, as described above. An override spool 366, normally urged into the position illustrated by a spring 368, is acted upon by fluid pressure from each of the conduits 64 and 66. Under normal operating conditions where the prime mover is within an acceptable speed range, relative pressure in the signal conduits 64 and 66 is not sufficient to urge the spool 366 upwardly. However, when operating speed of the prime mover increases above a predetermined maximum value, as described above, relative pressure in the signal conduit 64 increases and acts against the spring 368 to shift the spool 366 upwardly in order to regulate variable fluid communication from the actuator conduit 84 into the brake supply conduit 370. Thus, conduit 370 is normally pressurized, except for a condition of overspeed of the prime mover. Under this condition, the brake pressure control valve 129 is responsive to variable pressure in the conduit 370 for correspondingly engaging the brake 360.

Returning again to the speed limiting control valve 128, the conduit 370 has a branch conduit 372 for communicating the actuating brake fluid pressure from the conduit 370 through the branch conduit 372 into a passage 374 in the override speed control valve 126 (also see composite FIG. 8). Brake actuating pressure in the passage 374 acts through a piston 376 which is thus urged against the lever 352 in parallel with the manual control rod 344. Rightward movement of the piston 376 is limited by a pin 378 only for the purpose of preventing rapid oscillation of the piston 376 in response to pressure fluctuations in the passage 374.

The fluid signal communicated to the override speed control valve 126 through the conduit 372 is only a portion of a feedback signal generated by the speed limiting control valve 128 to provide an indication to the operator of the mount of engagement for the drive train brake 360. An additional fluid pressure signal is communicated from the speed limiting control valve to the override speed control valve through a conduit 380.

In order to develop the feedback signal within the conduit 380, fluid from the signal conduit 68 is communicated to a passage 382 of the speed limiting control valve 128. A first regulating spool 384, including a set of variable orifices 386 and a single orifice 387, functions in substantially the same manner as the spool 366 in response to differential pressure in the conduits 64 and 66. For example, when the prime mover 22 is operating within an acceptable speed range, pressure in the venturi signal conduit 64 is not sufficient relative to pressure in the conduit 66 to urge the spool 384 upwardly against its spring 389.

However, as operating speed of the prime mover increases above a predetermined maximum level, relative pressure is increased within the signal conduit 64 which serves to shift the spool 384 upwardly so that the orifices 386 begin to communicate a variable feedback signal into the passage 388 and the conduit 380, as further described below.

In addition, the orifice 387 provides selective communication between the passage 382 and the conduit 222. The passage 382 is always pressurized to a relatively higher degree than the conduit 222. The purpose of the orifice 387 is to increase pressure in the conduit 222 during overspeed conditions of the prime mover. For example, if the operator sets the speed control valve 112 at a selected level, pressure in the conduit 222 will tend to approach a corresponding setting during normal operation. However, pressurized fluid communicated from the passage 382 through the orifice 387 also increases the pressure level in the conduit 222. This additional pressurization in the conduit 222 serves as an artificial signal corresponding to a further increase in output speed of the hydrostatic transmission in order to reduce the overspeed condition of the prime mover.

The feedback signal in the passage 388 is also acted upon by a second regulating spool 390 which is responsive to high pressure signal fluid from the conduit 222 and low pressure signal fluid from the conduit 132. The differential pressure between these two conduits is of course proportional to output speed of the drive train so that the spool 390 is operable for further adjusting the feedback signal in the passage 388 in proportion to operating speed of the drive train or vehicle.

In operation, the spool 390 is normally urged upwardly by its spring 392. Low pressure signal fluid from the conduit 132 acts upon the spool 390 in conjunction with its spring 392. High signal pressure from the conduit 222 acts upon the other end of the spool 390 in a chamber 394. Accordingly, a pressure differential between the conduits 222 and 132 is sufficient to shift the spool 390 downwardly against its spring in order to provide variable communication for the passage 388 with a drain passage 396 through a slot 391.

Thus, the feedback signal supplied into the conduit 380 is proportional both to operating speed of the prime mover as well output speed of the drive train which, in combination with the signal in the branch conduit 372, provides a true indication as to the amount of braking effort that is instantly provided by both the drive train brake 360 and the prime mover.

The feedback signal from the conduit 380 is communicated to a passage 398 in the override speed control valve 126 and a chamber 400 in order to act upon the spool 354 through a slug 402. Thus, by means of the lever 352 and the spool 354, the feedback signal within the chamber 400 serves to resist manipulation of the control rod 344 in proportion to engagement of the brake 360. Any hydraulic delays or fluctuations in the system are compensated for by a check valve 404 and a restrictive orifice 406 arranged in parallel between the passage 398 and the chamber 400.

From the immediately preceding description, it may be seen that the override speed control valve 126 and the speed limiting control valve 128 automatically function in combination to compute the amount of braking capacity required in addition to the dynamic capacity of the drive train in order to maintain operating speed of the prime mover within acceptable limits. The speed limiting control valve further functions to automatically apply the supplemental brake within the drive train while delivering a feedback signal to the override speed control valve as an indication to the operator of the amount of engagement for the drive train brake.

The brake pressure control valve 129 merely functions in response to a fluid signal from the speed limiting control valve 128 in the conduit 370 in order to proportionally apply the brake 360. It is noted that the brake 360 is of a type being normally disengaged. A regulating spool 408 is normally shifted downwardly by pressure in conduit 370 acting against spring 410. Thus, any pressure in passage 412 is blocked from the brake 360. As the signal from the conduit 370 decreases, due to overspeed of the prime mover, the spring 410 shifts the spool 408 upwardly to allow communication between the passage 412 and the brake 360. Any pressure communicated to the brake 360 also acts upon the spool 408 in opposition to the spring 410 by means of an interconnecting passage 414. Fluid from the passage 414 acts upon a slug 416 which is accordingly urged downwardly against the spool 408. The brake 360 is then disengaged by variable communication with a drain passage 418.

The brake pressure control valve 129 also includes a shuttle valve 420 which is automatically shifted in order to supply actuating fluid to the passage 412 from one of a pair of conduits 422 and 424. Preferably, the conduits 422 and 424 are in respective communication with the manifolds 36 and 38 for the hydrostatic transmission (also see FIG. 1). Since either of the manifolds may be filled with high pressure fluid depending upon the direction of operation for the transmission, the shuttle valve spool 420 serves to assure that the relatively high pressure side of the hydrostatic transmission is in communication with the passage 412 in order to assure adequate pressure for engaging the brake 360.

(4) DETAILED DESCRIPTION OF THE PREFERRED MODE OF OPERATION

It is believed that the mode of operation for the control valve assembly 102 is clearly set forth in the above description. However, the mode of operation for the various valve components within the control assembly 102 is briefly summarized below in order to assure a better understanding of their combined operation.

Initially, the speed control valve 112 is manually operable to develop a relatively high pressure in the conduit 174 relative to the low pressure signal conduit 132. The signal from the conduit 174 is modulated during either accelerating or decelerating operation of the transmission to provide a variable high pressure signal in the conduit 196.

The directional valve 116 responds to the differential pressure in the conduits 196 and 132 for performing three functions. Initially, the directional valve determines the direction of operation for the pump actuator 42 (see FIG. 1) in order to determine forward or reverse operation of the drive train. Secondly, the directional valve establishes the sequence in which displacement of the hydrostatic pump 32 and motor 34 takes place. Finally, the directional valve includes a third valve component for modulating a decreasing differential pressure in the conduits 196 and 132 in order to regulate deceleration of the hydrostatic transmission only during a direction change. As the transmission passes through a neutral condition, the modulating valve 114 thereafter functions to again regulate the rate of acceleration for the transmission.

The range selector valve 118 functions to automatically shift a multiple speed range transmission unit 26 (FIG. 1) into a different speed range as the hydrostatic transmission approaches a select limit of displacement. Concurrently, the pilot control valve 50 for the hydrostatic motor actuator 48 responds to the differential pressure signal in conduit 222 and the low pressure signal conduit 132. The function of the range selector valve 118 and the automatic response of the pilot control valve 50 is timed by operation of the accumulator 120.

Before operation of the transmission can be initiated, however, it is first necessary that the safety control valve 122 be positioned to disengage a parking brake 158 (see FIG. 4) and also to block communication between the conduits 160 and 162 so that differential pressurization may be developed within the low pressure signal conduit 132 and the high pressure signal conduit 222 or 196. The safety control valve 122, of course, provides these functions when the speed control valve 112 is first returned to a neutral position so that the transmission units may thereafter be accelerated in proper sequence.

As noted above, the underspeed control valve 124 functions in a generally conventional fashion to decrease the differential signal in the conduits 132 and 196 when the prime mover is operating beneath a predetermined minimum speed level.

The override speed control valve 126 provides a means for selectively accomplishing the same purpose in order to decelerate the drive train at any time desired by the operator.

Any corresponding overspeed conditions of the prime mover are sensed by the speed limiting control valve 128 which accordingly causes engagement of a brake 360 within the drive train in order to supplement dynamic braking capacity of the hydrostatic transmission unit. The speed limiting control valve 128 further communicates a feedback signal to the override speed control valve 126 which is proportional to actual engagement of the brake 360, actual operating speed of the prime mover and actual output speed of the drive train in order to provide a true indication to the operator as to the combined degree of braking from the brake 360, and the prime mover through the drive train.

Figure 13:
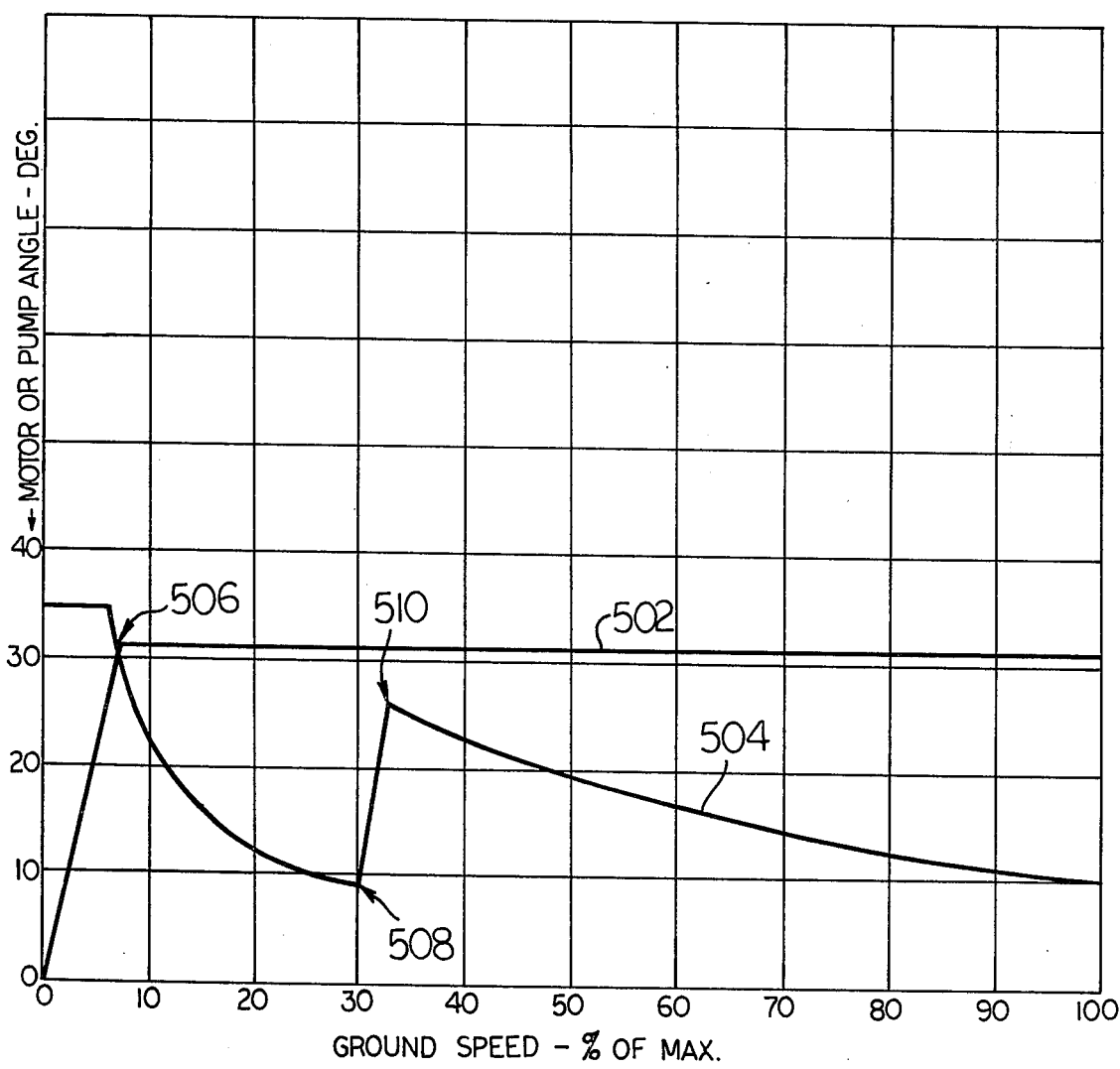
FIG. 13 is a graphical representation illustrating accelerating and/or decelerating response of the combined transmission units of the present invention to a control signal.

The graph of FIG. 13 also clarifies the manner in which the combined hydrostatic and multiple speed range transmission units function in combination. Referring now to FIG. 13, the curve indicated at 502 represents the angle of displacement for the pump 32 (regardless of operating direction) while the curve 504 represents the angle of displacement for the motor 34 (also see FIG. 1). At zero speed of the transmission, for example, during start up conditions with the speed control valve 112 being in neutral, the pump is at minimum displacement while the motor is at maximum displacement. As the operating speed of the drive train is increased through manipulation of the speed control valve 112, the pump 32 is first shifted from minimum toward maximum displacement. As it reaches maximum displacement as indicated at 506, the motor 34 begins to experience displacement variation from its maximum condition toward a minimum. As displacement of the motor 34 approaches a condition of minimum displacement indicated at 508 on the graph, the range selector valve 118 (see FIG. 2) automatically shifts the multiple speed range transmission unit into a different speed range. Simultaneously, displacement of the motor is shifted or reset back toward its condition of maximum displacement. Resetting of the motor 34 occurs between points 508 and 510 on the graph. Thereafter, the motor again continues to experience gradually decreasing displacement in order to provide acceleration within the higher speed range setting established by the range selector valve.

The above procedure graphically represented in FIG. 13 may be performed in opposite relation for decelerating operation of the drive train. Thus, the graph of FIG. 13 indicates that the shift between speed ranges, indicated between the points 508 and 510, may take place at any point selected along the curve in order to establish the most desirable torque transmitting characteristics within the drive train. This feature is particularly facilitated by the automatic and simultaneous conditioning of the multiple speed range transmission and the hydrostatic motor in response to a single differential signal.

What is claimed is:

1. A vehicular drive train for coupling a prime mover with a primary output shaft, comprising
    a hydrostatic transmission unit including a hydraulically actuated translating means capable of infinitely variable displacement,
    a multiple speed range transmission unit arranged in series with the hydrostatic transmission unit between the prime mover and the primary output shaft, and
    a control valve assembly including
        a speed control valve in communication with a source of fluid under pressure and first and second signal conduits, the speed control valve being manually operable to develop a differential pressure in the signal conduits proportional to a desired rate of speed for the vehicle,
        double-acting pilot means responsive to fluid pressure for varying displacement of the translating means,
        a directional control valve selectively communicating the two signal conduits with the pilot means,
        a modulating valve in communication with the two signal conduits and including means for modulating fluid flow rate in each direction through one of the signal conduits in order to regulate the rate of both increasing and decreasing differential pressure between the two signal conduits corresponding to both acceleration and deceleration of the vehicle,
        a range selector valve in communication with the multiple speed range transmission unit and in effective communication with the two signal conduits for shifting between speed ranges as the translating means approaches a selected limit of displacement, and
        means for causing the pilot means to reset displacement of the translating means in response to shifting operation of the range selector valve.

2. The vehicular drive train of claim 1 wherein the hydrostatic transmission unit includes a hydraulic pump and hydraulic motor each capable of infinitely variable displacement, the motor being in a condition of maximum displacement and the pump being in a condition of minimum displacement when the transmission is in neutral, and further comprising sequencing means for regulating displacement changes in the pump and motor.

3. The vehicular drive train of claim 2 wherein the motor is reset to maximum displacement by the pilot means upon a shift between speed ranges in the multiple speed transmission unit, the motor thereafter being responsive to further increases of the differential pressure during acceleration in the higher speed range.

4. The vehicular drive train of claim 2 further comprising modulating means for establishing a selected deceleration rate only during a directional shift of the hydrostatic transmission unit.

5. The vehicular drive train of claim 1 wherein operation of the pilot means for resetting displacement of the translating means occurs independently from any substantial variation of the differential pressure in order to provide smoother operation of the hydrostatic transmission unit in the multiple speed ranges.

6. The vehicular drive train of claim 1 further comprising a safety reset valve which normally tends to maintain engagement of a brake within the drive train, the safety reset valve being operable in response to movement of the speed control valve to a position corresponding to neutral in order to release the brake.

7. The vehicular drive train of claim 1 further comprising an underspeed control valve being operable to decrease the differential pressure within the two signal conduits in response to operation of the prime mover at a speed below a selected value, an override speed control valve being manually operable to also reduce the differential pressure within the two signal conduits in order to selectively decrease operating speed of the vehicle without necessarily adjusting the speed control valve.

8. The vehicular drive train of claim 7 further comprising means responsive to operating speed of the prime mover for actuating the underspeed control valve.

9. The vehicular drive train of claim 7 wherein the underspeed control valve is in communication with a relief and replenishing valve group for the hydrostatic transmission unit and with the two signal conduits to communicate excess fluid from the signal conduits to the relief and replenishing valve group.

10. The vehicular drive train of claim 7 further comprising a speed limiting control valve which is operable to selectively actuate a brake within the drive train and means for actuating the speed limiting control valve in response to operation of the prime mover at speeds in excess of a selected value.

11. The vehicular drive train of claim 10 wherein the speed limiting control valve includes means for communicating fluid pressure to the override speed control valve in proportion to application of the brake within the drive train in order to develop feedback pressure for resisting manual operation of the override speed control valve.

12. The vehicular drive train of claim 11 wherein the speed limiting control valve includes means for developing a fluid signal having a pressure proportional to both operating speed of the vehicle and operating speed of the prime mover and communicating that signal to the override speed control valve in order to provide a feedback signal for resisting manual operation thereof.

13. The vehicular drive train of claim 12 further comprising a modulating means for establishing a selected deceleration rate during directional shifts of the hydrostatic transmission unit independently from the normal deceleration rate established by the modulating valve, the speed limiting control valve being operable to selectively apply the brake within the drive train either in response to manual operation of the override speed control valve, in response to a directional change by the directional control valve or in response to a decelerating speed change by the speed control valve.

14. The vehicular drive train of claim 13 wherein the means responsive to operating speed of the prime mover comprises a proportional pump driven by the prime mover and a venturi orifice in communication with output fluid from the proportional pump and further comprising a constant volume flow control valve for communicating fluid pressure from the venturi orifice to the speed control valve.

15. The vehicular drive train of claim 1 wherein the primary output shaft supplies motive power for the vehicle, the prime mover also being directly coupled with an implement having at least momentary power requirements which together with motive power requirements for the vehicle may intermittently exceed available power from the prime mover.

16. A drive train for coupling a prime mover with an output shaft, comprising
a first transmission unit providing a positive coupling during both accelerating and decelerating operation of the drive train, the first transmission unit being operable for producing infinitely variable torque transmission and operating speed,
a multiple speed range transmission unit arranged in series with the first transmission unit between the prime mover and the output shaft, and
a control assembly for synchronizing operation of the first transmission unit and the multiple speed range transmission unit including
a control means being manually operable and responsive to prime mover speed to produce a signal representative of a desired rate of operation, the control means being operable to vary the signal in order to accomplish both accelerating and decelerating operation of the drive train,
a modulating means for receiving the signal from the manually operable control means, the modulating means including biasing means for automatically regulating the rate of variation of the signal corresponding to both accelerating and decelerating operation,
a pilot means responsive to the modulated signal and in communication with the first transmission unit for varying torque transmission thereacross,
directional control means for communicating the modulated signal from the modulating means to the pilot means, the directional control means being manually operable to adjust the direction of operation for the drive train, and
a range selector means being operatively coupled with the multiple speed range transmission unit and the first transmission unit for shifting the operating range of the multiple speed range transmission unit as torque transmission across the first transmission unit approaches a selected limit.

17. The drive train of claim 16 wherein the pilot means for varying torque transmission through the first transmission unit includes means for automatically resetting the torque transmitting capability of the first transmission unit when the operating range of the multiple speed range transmission unit is shifted in order to permit continued variation of torque transmission across the first transmission unit in response to further operation of the manually operable control means.

18. The drive train of claim 17 further comprising an underspeed control means effective to decrease the modulated signal and thereby reduce torque transmission through the first transmission unit when the prime mover is operating at a rate of speed below a selected value, an override speed control means being manually operable to effectively decrease the modulated signal and thereby decrease operating speed of the drive train without necessarily resetting the manually operable control means.

19. The drive train of claim 18 further comprising a speed limiting control means being operable to engage brake means within the drive train in order to supplement dynamic braking of the first transmission unit when operating speed of the prime mover exceeds a selected maximum value.

20. The drive train of claim 19 further comprising means for producing a signal proportional to engagement of the brake means by the speed limiting control means and communicating that signal to the override speed control means as a feedback signal for resisting its manual operation in proportion to engagement of the brake means within the drive train.

21. The drive train of claim 16 further comprising an underspeed control means effective to decrease the modulated signal and thereby reduce torque transmission through the first transmission unit when the prime mover is operating at a rate of speed below a selected value and an override speed control means being manually operable to effectively decrease the modulated signal and thereby decrease operating speed of the drive train without necessarily resetting the manually operable control means.

22. The drive train of claim 16 further comprising a speed limiting control means for selectively engaging brake means without the drive train in order to supplement dynamic braking capacity of the first transmission unit when the operating speed of the prime mover exceeds a selected maximum value.

23. A control assembly for synchronizing operation of a hydrostatic transmission unit, including a hydraulic translating means with variable displacement, and a multiple speed range transmission unit arranged in series within a drive train, comprising
a manually operable control means operatively coupled with the hydraulic translating means in the hydrostatic transmission unit for varying its displacement,
a range selector means operatively coupled with the multiple speed range transmission unit and the hydraulic translating means for shifting the operating range of the multiple speed range transmission unit as the hydraulic translating means approaches a selected condition of displacement, and
a pilot means operatively coupling a hydraulic translating means with a manual control means and a range selector means, the pilot means automatically resetting the hydraulic translating means in the operating range of the multiple speed range transmission unit is shifted in order to permit continued variable displacement response to the hydraulic translating means to the manual control means the manually operable control means and the range selector means respectively produce first and second signals, the pilot means being responsive to the first signal for gradually varying displacement of the hydraulic translating means from a first selected limit of displacement to a second selected limit of displacement, the pilot means including means responsive to said second signal for resetting the hydraulic translating means from its second selected limit of displacement to its first selected limit of displacement.

24. The control assembly of claim 23 wherein the hydraulic translating means is a hydrostatic motor, the first selected limit of displacement representing relatively maximum displacement of the hydraulic motor and the second selected limit of displacement representing relatively minimum displacement.

25. The control assembly of claim 23 wherein the means included in the pilot means is responsive to the second signal independently of the first signal from the manually operable control means in order to permit relatively continuous response of the hydraulic translating means to the manually operable control means.

26. The control assembly of claim 23 further comprising a directional selector means operatively coupling the manually operable control means with the hydraulic translating means in the hydrostatic transmission unit, the directional selector means being operable to establish the direction of operation for the drive train.

27. The control assembly of claim 23 wherein the manually operable control means comprises means for generating a variable signal representative of a desired rate of operation for the drive train and further comprising a modulating means for receiving the variable signal and regulating the rate of variation for the variable signal, the pilot means being responsive to the modulating means for varying displacement of the hydraulic translating means in proportion to the regulated variable signal from the manually operable control means and the modulating means.

28. A drive train for coupling a prime mover with a primary output shaft comprising a hydrostatic transmission unit including a hydraulic translating means capable of variable displacement, a multiple speed range transmission unit arranged in series with a hydrostatic transmission unit between the prime mover and the output shaft, a manually operable control means operatively coupled with a hydraulic translating means in the hydrostatic transmission for varying its displacement;

a range selector means operatively coupled with a multi-speed transmission and a hydraulic translating means for shifting the operating range of the multiple speed range transmission unit as the hydraulic translating means approaches a selected condition of displacement, and a pilot means operatively coupling the hydraulic translating means with the manually operable control means and the range selector means, the pilot means automatically resetting displacement of the hydraulic translating means when the operating range of the multiple speed range transmission unit is shifted in order to permit continued variable displacement response of the hydraulic translating means of the manually operable control means the manually operable control means and the range selector means respectively produce first and second signals, the pilot means being responsive to the first signal for gradually varying displacement of the hydraulic translating means from a first selected limit of displacement, the pilot means including means responsive to the second signal for resetting the hydraulic translating means from its second selected limit of displacement to its first selected limit of displacement.

29. The drive train of claim 28 wherein the hydraulic translating means is a hydrostatic motor, the first selected limit of displacement representing relatively maximum displacement of the motor and the second selected limit of displacement representing relatively minimum displacement.

30. The drive train of claim 28 wherein the means included in the pilot means is effective for response to manually operable control means in order to permit relatively continuous response of the hydraulic translating means to the manually operable control means.

31. In a method for synchronizing operation of a hydrostatic transmission unit including a hydraulic translating means of variable displacement and a multiple speed range transmission unit arranged in series within a drive train, the steps comprising producing a signal to which the hydraulic translating means is responsive for varying its displacement and varying the signal in proportion to a desired rate of operation for the drive train, modulating the signal to regulate its rate of change corresponding to both accelerating and decelerating operation of the transmission, applying the modulated signal to the hydraulic translating means in order to vary displacement of the translating means and torque transmitting capacity of the hydrostatic transmission unit, and shifting the multiple speed range transmission unit into a different operating speed range as the hydraulic translating means approaches a selected limit of displacement and substantially simultaneously resetting displacement of the hydraulic translating means to permit its continued response to the modulated signal.

32. The method of claim 31 wherein the hydrostatic transmission unit and the multiple speed range transmission unit are arranged in series between a prime mover and a primary output shaft, and further comprising the steps of adjusting the modulated signal to cause decelerating operation of the hydrostatic transmission unit when the prime mover is operating at a speed below a selected value and applying a brake within the drive train in response to operation of the prime mover at speeds above a selected value in order to supplement dynamic braking capacity of the hydrostatic transmission unit.

33. The method of claim 32 further comprising the steps of producing a feedback signal proportional to both operating speed of the primary output shaft and operating speed of the prime mover and applying the feedback signal to a manual control employed for the step of overriding the modulated signal to cause deceleration of the hydrostatic transmission unit.

* * * * *